United States Patent
Norell et al.

(10) Patent No.: US 8,615,845 B2
(45) Date of Patent: Dec. 31, 2013

(54) VACUUM ASSEMBLY FOR AUTOMOBILE

(75) Inventors: Neil N. Norell, Endicott, NY (US); James M. Robitaille, Montoursville, PA (US); Matthew L. Huff, Williamsport, PA (US)

(73) Assignee: Shop Vac Corporation, Williamsport, PA (US)

( * ) Notice: Subject to any disclaimer, the term of this patent is extended or adjusted under 35 U.S.C. 154(b) by 501 days.

(21) Appl. No.: 12/574,685

(22) Filed: Oct. 6, 2009

(65) Prior Publication Data
US 2010/0083457 A1 Apr. 8, 2010

Related U.S. Application Data

(60) Provisional application No. 61/103,142, filed on Oct. 6, 2008.

(51) Int. Cl.
*A47L 11/00* (2006.01)
*A47L 13/00* (2006.01)

(52) U.S. Cl.
USPC .......................................................... 15/413

(58) Field of Classification Search
None
See application file for complete search history.

(56) References Cited

U.S. PATENT DOCUMENTS

| | | | | |
|---|---|---|---|---|
| 1,918,695 | A | * | 7/1933 | Gilbert .............................. 310/89 |
| 3,449,787 | A | * | 6/1969 | Rothstein et al. ................ 15/313 |
| 5,068,555 | A | * | 11/1991 | Oberdorfer-Bogel .......... 310/52 |
| 5,560,075 | A | | 10/1996 | Jankowski |
| 5,737,798 | A | | 4/1998 | Morén et al. |
| 5,829,091 | A | | 11/1998 | Ingram et al. |
| 6,385,810 | B1 | | 5/2002 | Lang |
| 6,488,475 | B2 | * | 12/2002 | Murata et al. .................... 417/32 |
| 6,735,810 | B2 | * | 5/2004 | Najm et al. ...................... 15/313 |
| 7,050,929 | B2 | | 5/2006 | Norell et al. |
| 7,095,150 | B2 | | 8/2006 | Norell et al. |
| 7,208,907 | B2 | | 4/2007 | Norell et al. |

(Continued)

FOREIGN PATENT DOCUMENTS

| | | |
|---|---|---|
| EP | 0 415 076 A2 | 3/1991 |
| EP | 0 969 589 A2 | 1/2000 |

(Continued)

OTHER PUBLICATIONS

International Preliminary Report on Patentability for Application No. PCT/US2009/059753 dated Apr. 12, 2011.

(Continued)

*Primary Examiner* — Bryan R Muller
(74) *Attorney, Agent, or Firm* — Marshall, Gerstein & Borun LLP

(57) ABSTRACT

The disclosed vacuum cleaner system for an automobile fits in a cavity in the vehicle and has a tank that can be removed in a lateral direction without tools and without detaching the vacuum hose. A circuit board that carries an electronic controller is positioned alongside the motor and extends generally parallel to both the axis of the motor and the lateral direction in which the tank is removed. Cooling air is drawn though a cooling air inlet on the cabin wall to the circuit board, and then one side of the motor, through the center of the motor, to the cooling fan. From there, it is blown into a cavity where it joins exhausted working air from the vacuum and is exhausted from the vehicle through an air release opening that leads to the exterior of the vehicle.

8 Claims, 37 Drawing Sheets

(56) References Cited

U.S. PATENT DOCUMENTS

| | | |
|---|---|---|
| 7,342,339 B2 | 3/2008 | Norell et al. |
| 7,443,123 B2 | 10/2008 | Norell et al. |
| 2004/0088818 A1 | 5/2004 | Hafling et al. |
| 2004/0135537 A1 | 7/2004 | Conner et al. |
| 2005/0011035 A1 | 1/2005 | Rukavina et al. |
| 2006/0080801 A1 | 4/2006 | Nameth |
| 2006/0156504 A1* | 7/2006 | Bruneau .................. 15/314 |
| 2007/0056139 A1* | 3/2007 | Lee et al. ................. 15/412 |

FOREIGN PATENT DOCUMENTS

| | | |
|---|---|---|
| GB | 2 388 311 A | 11/2003 |
| GB | 2 394 649 A | 5/2004 |
| GB | 2 406 223 A | 3/2005 |
| WO | WO-2008/147106 A1 | 12/2008 |

OTHER PUBLICATIONS

International Preliminary Report on Patentability for Application No. PCT/US2009/059756 dated Apr. 12, 2011.
International Preliminary Report on Patentability for Application No. PCT/US2009/005508 dated Apr. 12, 2011.
International Preliminary Report on Patentability for Application No. PCT/US2009/005507 dated Apr. 12, 2011.
International Search Report and Written Opinion for Application No. PCT/US2009/005507 dated Mar. 19, 2010.
International Search Report and Written Opinion for Application No. PCT/US2009/005508 dated Mar. 19, 2010.
International Search Report and Written Opinion for Application No. PCT/US2009/059756 dated Mar. 31, 2010.
International Search Report and Written Opinion for Application No. PCT/US2009/059753 dated Mar. 31, 2010.

* cited by examiner

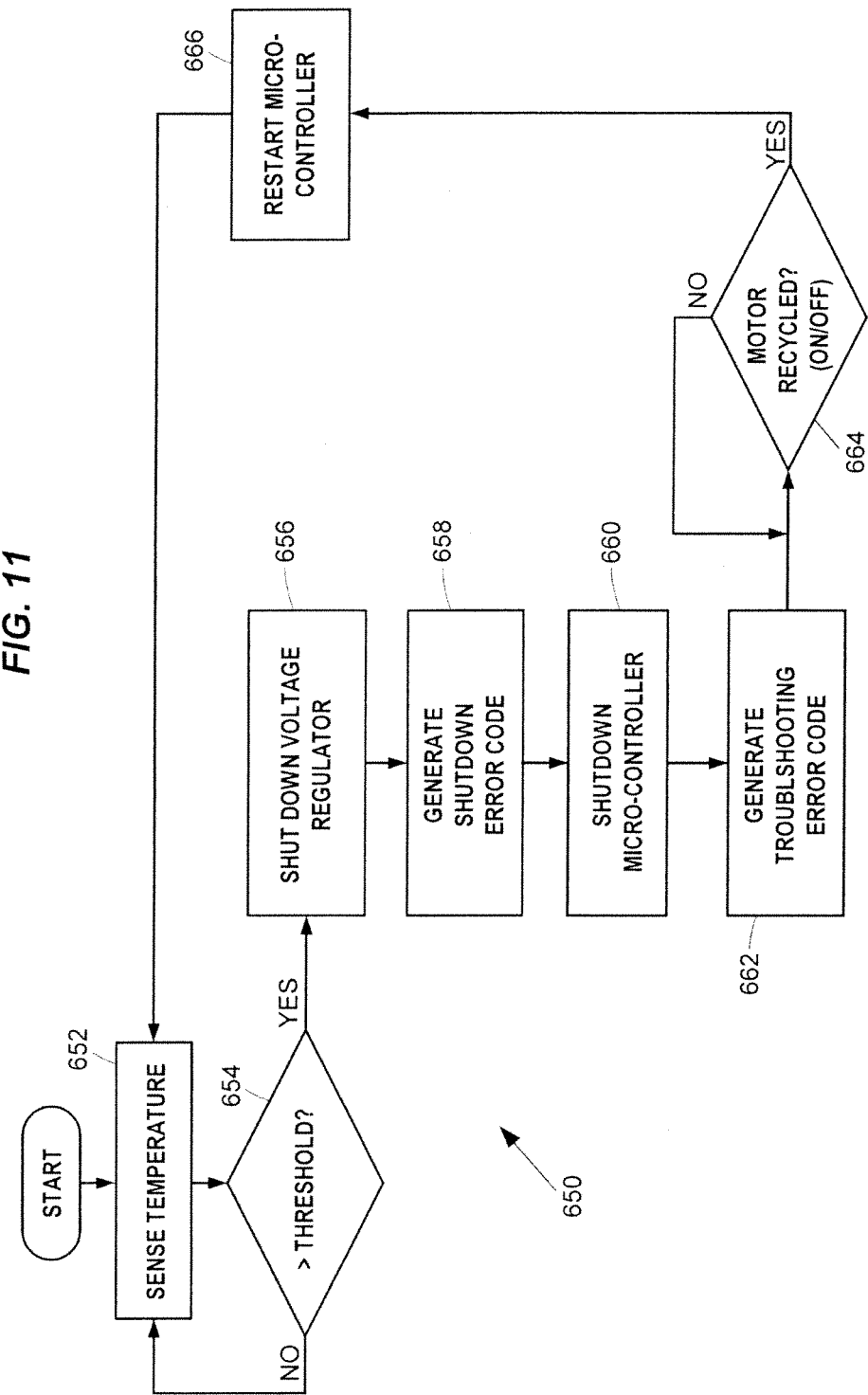

VACUUM ASSEMBLY FOR AUTOMOBILE

CROSS REFERENCE TO RELATED APPLICATIONS

The present application claims the benefit of U.S. Provisional Application No. 61/103,142, entitled "Integrated Vacuum System for Vehicles," filed on Oct. 6, 2008, which is hereby incorporated by reference herein in its entirety.

TECHNICAL FIELD

The present disclosure is generally related to vacuum system, and more specifically to an integrated vacuum assembly having a cooling air pathway to a circuit board.

BACKGROUND

The invention described in this document relates generally to vehicles and particularly to vacuum systems that can be installed as a stock component or an aftermarket component of a vehicle such as an automobile.

Many automobiles, including minivans, are designed for transporting active families or groups, such as members of athletic teams. Other automobiles, including SUV's, are designed for rugged use. Although all types of automobiles are prone to become dirty, some automobiles are particularly prone to collecting dirt or debris in the cabin. An internally-mounted vacuum system could make it easier for vehicle owners to keep their vehicles clean.

There are many challenges to creating such a system. For example, the components, including the ducting, must be arranged to fit within a relatively tight space. Also, traditional vacuum cleaners are plugged into conventional AC outlets (which automobiles do not have), so power supply is an open question. Further, internal mounting of a vacuum presents unresolved challenges in arranging the components so that the dirt and debris—once collected—can be easily removed.

BRIEF DESCRIPTION OF THE DRAWINGS

The invention may be better understood by referring to the accompanying drawings, in which:

FIG. 11 illustrates a flowchart for sensing temperature of the brushless motor using the control circuit of FIG. 6;

DETAILED DESCRIPTION

Figure 1:
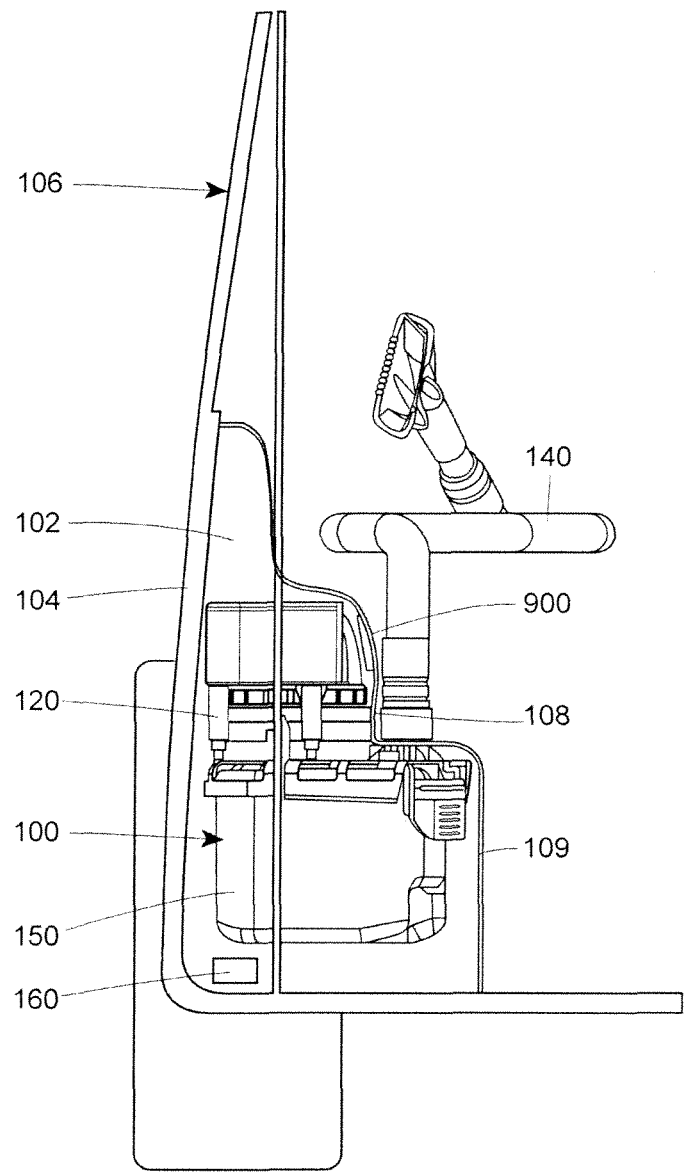
FIG. 1 is a cut-away partial end view of a vehicle that is provided with one embodiment of a vacuum system that uses the invention.

Although other positions and arrangements are possible, the vacuum cleaner system 100 seen in FIG. 1 is mounted within an internal cavity 102 between an external rear quarter panel 104 of a vehicle 106 and a generally vertical cabin wall segment 108 within the cabin 110. The cabin wall seen here has a door 109 that provides access to the system 100, for instance for collecting debris from the system, as discussed more fully below. Generally, but not necessarily, the vehicle 106 may be a wheeled, motor driven vehicle capable of transporting passengers, cargo, or both. For example, the vehicle 106 may be an automobile, SUV, mini-van, truck or other passenger vehicle. The vehicle 106 may be a truck, a bus, a van, or a recreational vehicle (RV). The vehicle 106 may be powered by any type of known vehicle engine, such as an internal combustion engine fueled by diesel, ethanol, gasoline, hydrogen, biofuels or other fuel. The vehicle 106 may be powered by an entirely electric engine. The vehicle 106 may be powered by a hybrid electric/fuel engine. In fact, any vehicle in which an integrated vacuum cleaner system may be desirable may include embodiments of the vacuum cleaner system 100.

Figure 2:
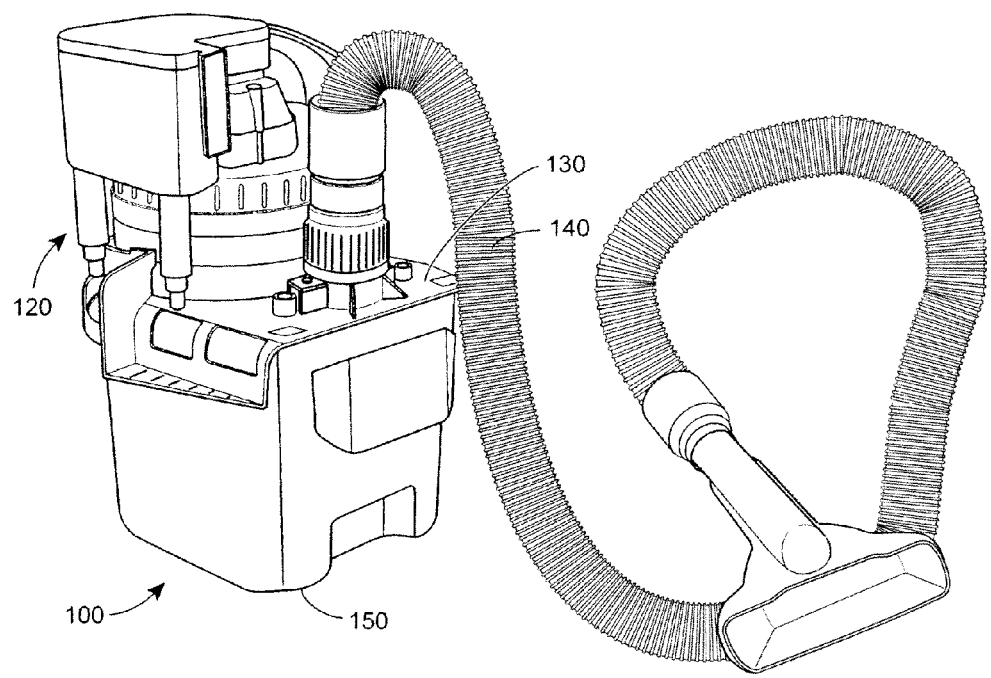
FIG. 2 is a perspective view of the vacuum system seen in FIG. 1.

As seen in FIG. 2, the illustrated vacuum cleaner system has four general components: a motor/fan assembly 120, a chassis wall 130, a hose 140, and a removable tank 150. Each of these components will be discussed in more detail below.

The vehicle in which this system is mounted has an air release opening 160 (FIG. 1) that leads from the cavity 102 to the exterior of the vehicle. This kind of opening has in the past been used to provide pressure relief when the doors of the vehicle are slammed close. In the illustrated arrangement, the opening also provides a vent for exhaust of both the working air of the vacuum and cooling air used to cool the motor/fan assembly.

The Motor/Fan Assembly

Different kinds of motors can be used in the motor/fan assembly. In the illustrated system, best seen in FIG. 3A, the motor 200 is a brushless or switched reluctance (SR) motor that is mounted in a generally vertical arrangement behind the cabin wall segment 108. A main air impeller 210 powered by the motor is connected to a lower end of the motor and spins on a generally vertical axis. The impeller draws working air axially upward along its axis, and spins it radially outwardly, providing the vacuum source for the vacuum assembly. As is known in the art, the blades on the impeller 210 can be arranged in a variety of different ways. A two-stage impeller, which is essentially two impellers that are stacked and rotate on the same shaft so that the air flows serially through them, can be advantageous.

Figure 4:
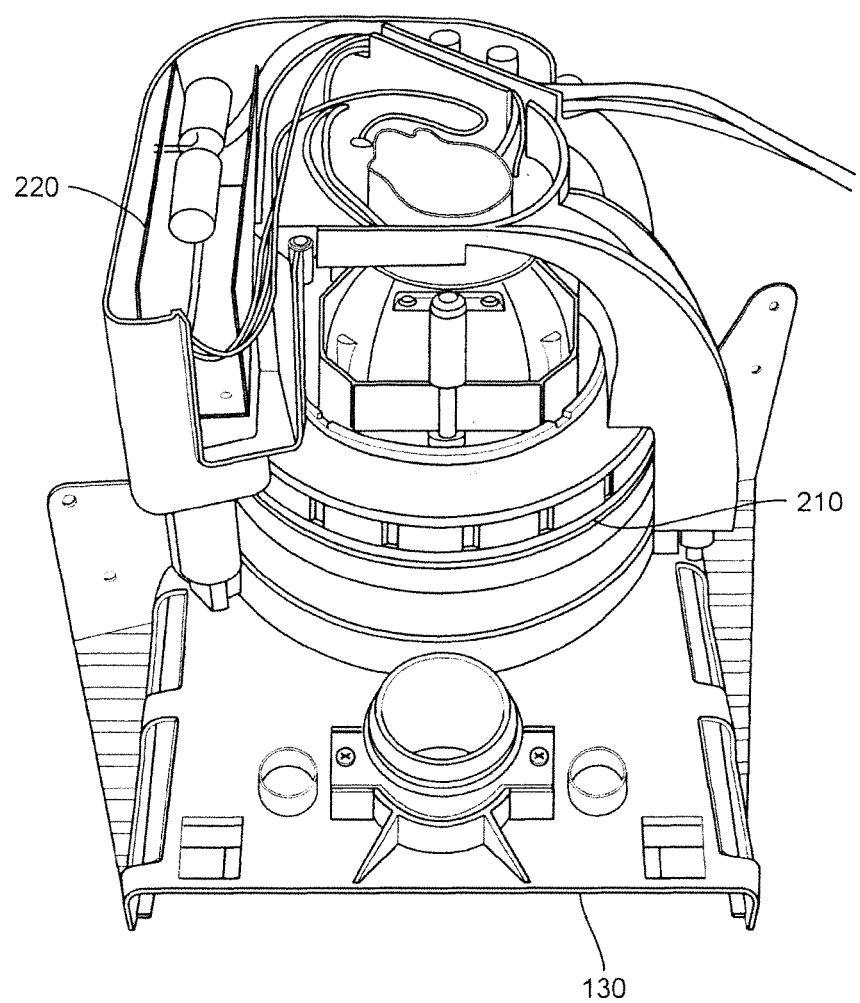
FIG. 4 is a view of the chassis wall and the motor/fan assembly in the vacuum system.
Figure 5:
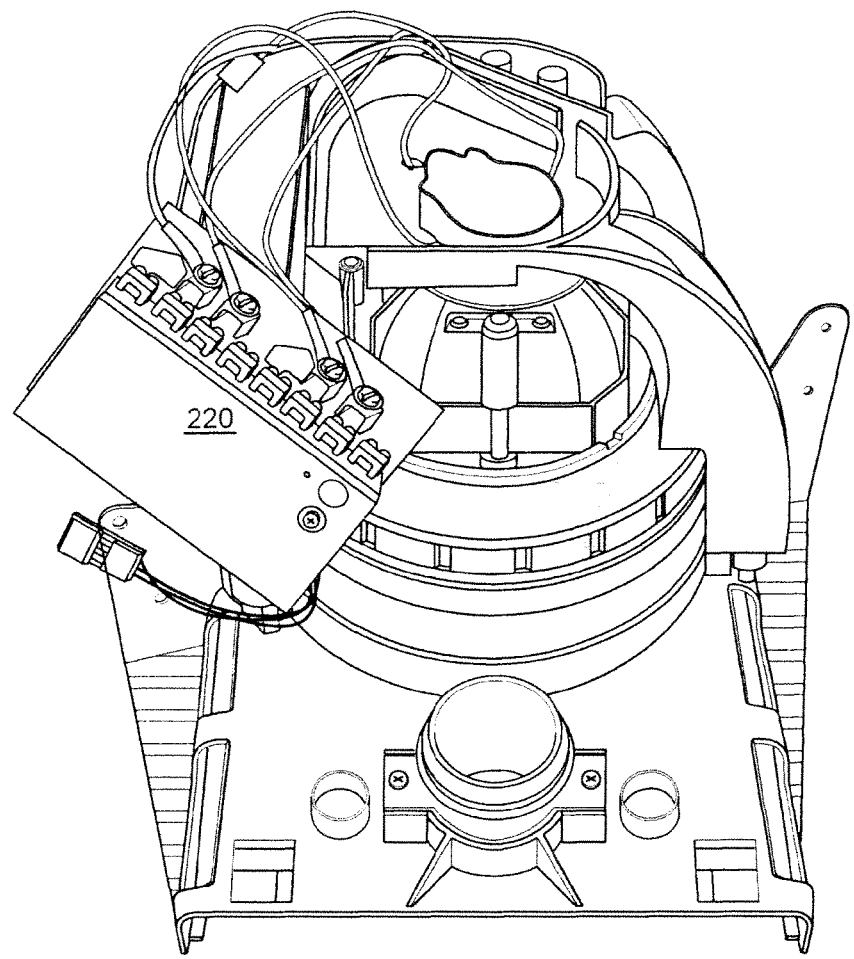
FIG. 5 shows the circuit board removed from the motor/fan assembly.

The illustrated SR motor 200 is controlled by an electronic controller that is mounted on a circuit board 220 that is best seen in FIGS. 4 and 5. This circuit board is positioned alongside the motor. The circuit board extends generally perpendicularly to the cabin wall segment 108 and generally parallel to the axis of the main impeller 210. This arrangement provides a relatively thin and compact unit that fits conveniently within the cavity 102 of the vehicle. The motor 200 may receive electrical power directly from an electrical power storage device or battery (not shown) used to start the engine of the vehicle itself. For example, the electrical power storage device may be a rechargeable battery that supplies electric energy to the vehicle, such as an SLI (Starting, Lighting, Ignition) battery, a traction battery, a battery in a hybrid vehicle (e.g., a nickel metal hydride, zebra or lithium ion battery), and the like. A detailed discussion of how the motor 200 receives electrical power from the vehicle is discussed in a future section of the present disclosure.

As known in the art, a switched reluctance motor such as the SR motor 200 is an electrical motor that includes a rotor and a stator. Torque in a reluctance motor is produced by the tendency of the rotor to move to a position relative to the stator in which the reluctance of a magnetic circuit is minimized, i.e. a position in which the inductance of an energized stator winding is maximized. In a switched reluctance motor, circuitry is provided for detecting the angular position of the rotor and sequentially energizing phases of the stator windings as a function of rotor position.

Switched reluctance motors are doubly salient motors having poles on both the stator and the rotor, with windings only on the stator poles. The rotor of a switched reluctance motor does not include commutators, permanent magnets, or windings.

Torque may be produced by energizing or applying current to the stator windings of the stator poles associated with a particular phase in a predetermined sequence. The energization of the stator windings is typically synchronized with the rotational position of the rotor. A magnetic force of attraction results between the poles of the rotor and the energized stator poles associated with a particular phase, thereby causing the rotor poles to move into alignment with the energized stator poles.

In typical operation, each time a stator winding of the switched reluctance motor is energized, magnetic flux flows from the energized stator poles associated with a particular phase, across an air gap located between the stator poles and the rotor poles, and to the rotor poles. Magnetic flux generated across the air gap between the rotor poles and the stator poles produces a magnetic field in the air gap that causes the rotor poles to move into alignment with the energized stator poles associated with a particular phase, thereby producing torque. The amount of magnetic flux and, therefore, the amount of torque generated by the switched reluctance motor is dependent upon many variables such as, for example, the magnetic properties of the material of the rotor poles and the stator poles, and the length of the air gap between the rotor poles and the stator poles.

Figure 3A:
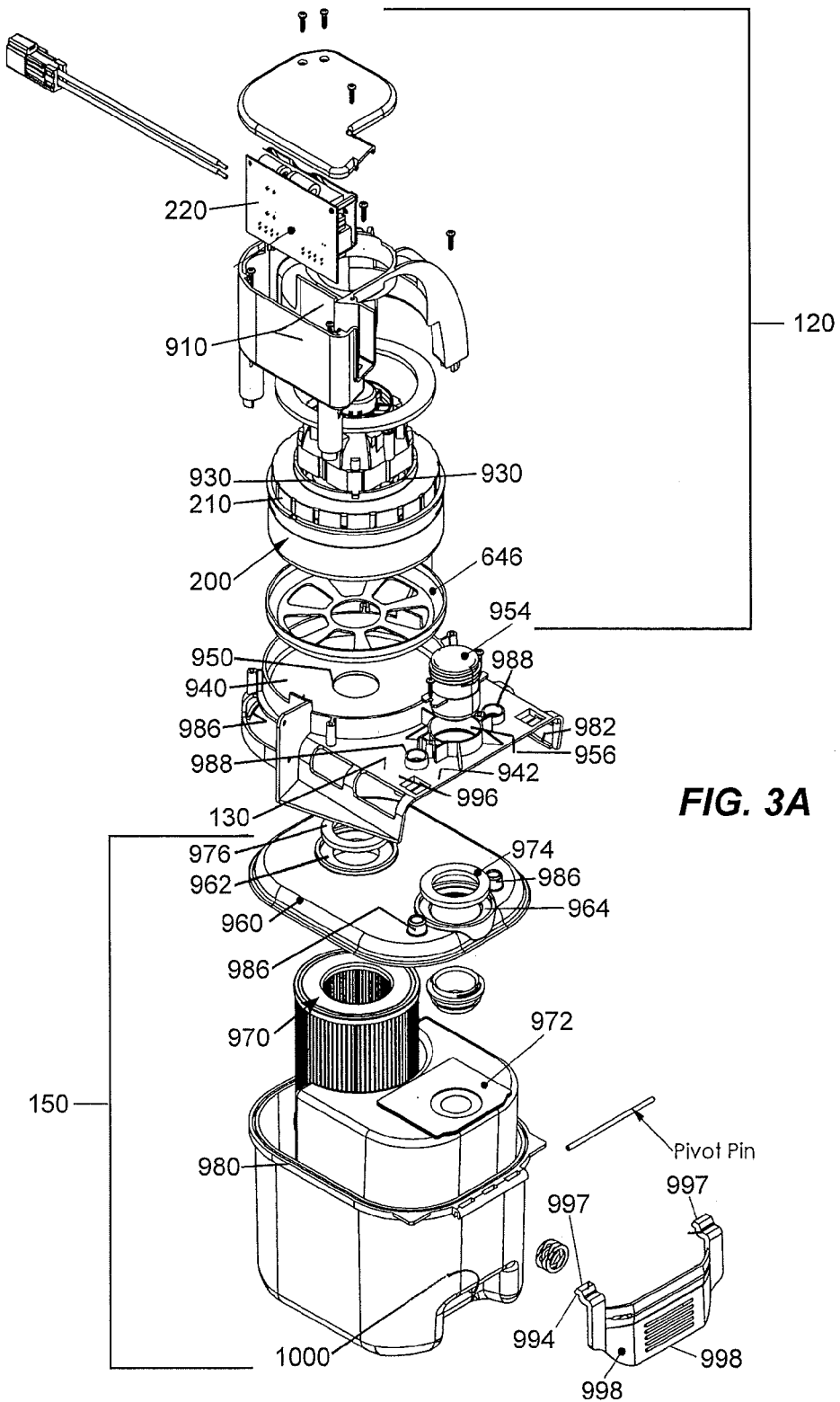
FIG. 3A is an exploded perspective view of parts of the vacuum system.
Figure 3B:
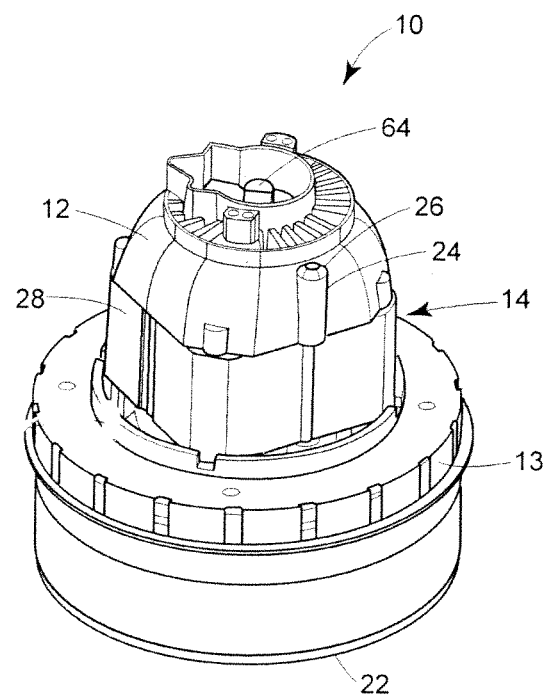
FIG. 3B is a perspective view of a switched reluctance motor, including a stator and a rotor.
Figure 3C:
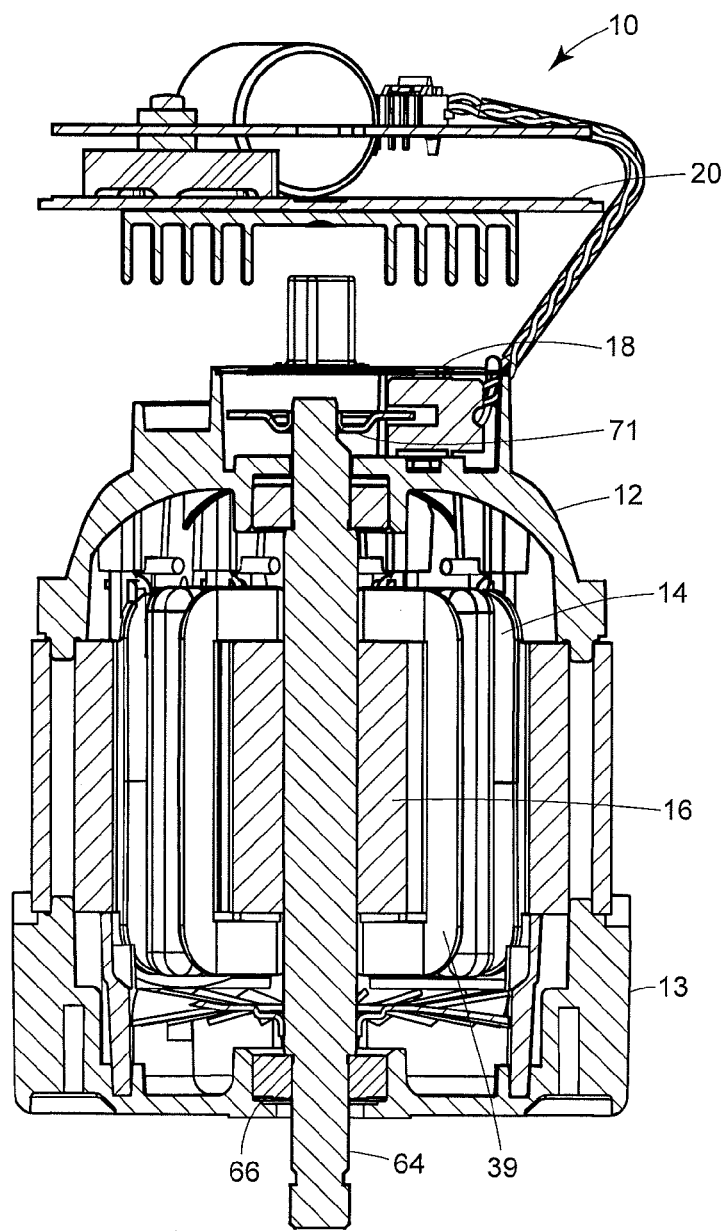
FIG. 3C is a sectional view of the motor shown in FIG. 3B.

One embodiment of the SR motor 200 of FIG. 3A for use in the integrated vacuum cleaner system 100 for vehicles is illustrated in FIGS. 3B-3G. Referring to FIGS. 3B and 3C, a switched reluctance motor 10 may be constructed as a package or unit of subassemblies, each of which may be separately preassembled and combined together during a manufacturing process. Specifically, the motor 10 may include an upper housing unit 12, a lower housing unit 13, a stator 14, a rotor 16, a drive assembly 18, a first end cap 20, and a second end cap 22. Both the upper housing unit 12 and the lower housing unit 13 may be annular in shape, with the first end cap 20 being coupled to the upper housing unit 12, and the second end cap 22 being coupled to the lower housing unit 13. As shown in FIGS. 3B-3C, each of the upper housing unit 12, the lower housing unit 13, the stator 14, the rotor 16, the drive assembly 18, the first end cap 20, and the second end cap 22 may be combined into a single package or unit.

The upper housing unit 12 may include a plurality of apertures 24 for receiving a plurality of fasteners 26 to secure the upper housing unit 12 to the stator 14 during assembly. It should be understood, however, that the upper housing unit 12 may be secured to the stator 14 in any other suitable manner such as, for example, by a clamp, amounting bracket/flange, or the like.

Figure 3D:
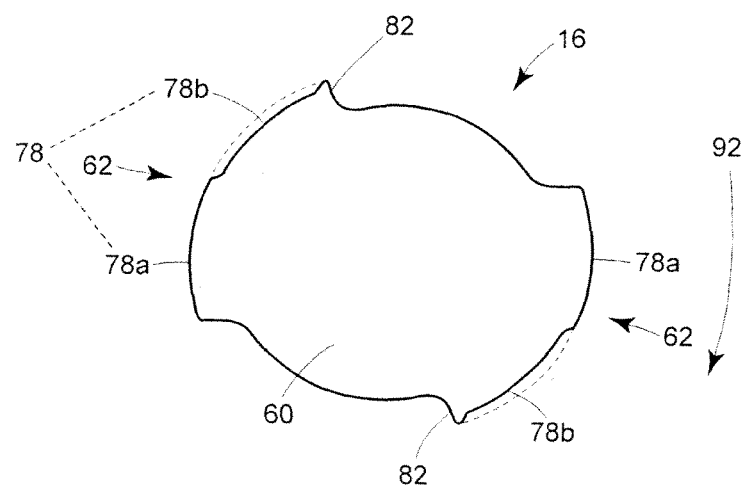
FIG. 3D is a view of the rotor of the motor shown in FIG. 3B.
Figure 3E:
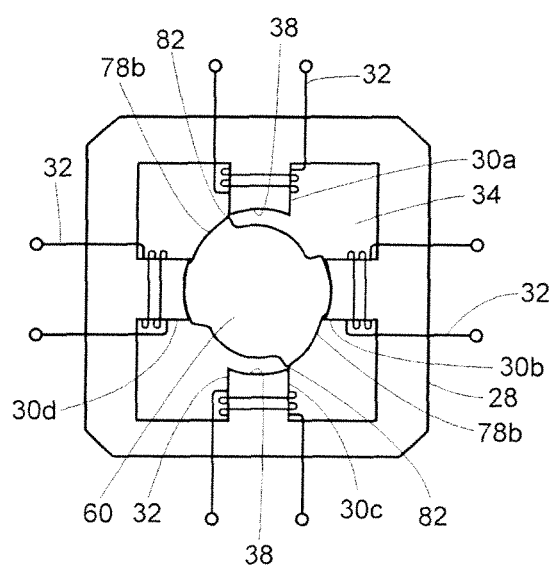
FIG. 3E is a cross-sectional view of the rotor of the motor shown in FIG. 3B disposed within an inner region of the stator core.

Referring to FIGS. 3D-3E, the rotor 16 may include a rotor core 60 and a plurality of equally spaced laminated rotor poles 62. The rotor core 60 is disposed within a central bore 34 defined by the stator 14 and is coupled to a shaft 64 (FIGS. 3B-3C). The shaft 64 is mounted through a bearing 66 for rotation concentric to the stator 14. The shaft 64 extends through the rotor core 60 and is coupled to a slotted disk or encoder 71. As will be described in greater detail below, when the slotted disk 71 rotates, the angular position of the rotor 16 may be determined. The shaft 64 is also coupled to a load such as, for example, a fan of the vacuum cleaner (not shown) or other driven device. The rotor core 60 may be stamped or formed from a plurality of laminated sheets, or laminations, of ferromagnetic material such as, for example, steel. The rotor laminations may be laminated together in a conventional manner and arranged in aback-to-back configuration.

As shown in FIGS. 3D-3E, the rotor poles 62 may include a rotor pole face 78 that includes a first portion 78a and a second portion 78b that is radially inwardly stepped or undercut with respect to the first portion 78a. A protrusion 82 may be located at a leading edge of the second portion 78b of the rotor pole face 78 that is remote from the first portion 78a of the rotor pole face 78. The protrusion 82 minimizes the air gap at the edge of the second portion 78b of the rotor pole 62 for magnetic flux flow, thereby optimizing torque characteristics of the motor 10. The plurality of rotor poles 62 are arranged in a circumferential path about the rotor core 60. The rotor poles 62 may project radially and outwardly from the shaft 64 to facilitate the rotation of the rotor 16 within the central bore 34 of the stator 14.

The stator 14 may include a stator core 28, a plurality of equally spaced stator poles 30, and stator windings 32 disposed on the stator core 28. The stator core 28 includes an inner surface that defines a central bore 34. In the embodiment illustrated in FIG. 3E, the stator 14 includes four circumferentially spaced-apart stator poles 30a, 30b, 30c, 30d projecting inwardly from the stator core 28 toward the central bore 34. Each of the stator poles 30a-d includes a stator pole face 38 at the end projecting into the central bore 34. The stator core 28 may be stamped or formed from a plurality of laminated sheets, or laminations, of ferromagnetic material such as, for example, steel. Laminated sheets may be used in the stator core 28 to control eddy currents and, thereby avoid overheating of the stator core 28. The stator laminations may be laminated together n a conventional manner and arranged in a back-to-back configuration.

It is known that magnetic flux generated across the air gap between an energized stator pole 30 and a rotor pole 62 of the motor 10 creates an attractive force between the energized stator pole 30 and the rotor pole 62. The amount of attractive force is dependent upon many variables such as, for example, the magnetic properties of the materials of the stator pole 30 and the rotor pole 62, and the size of the air gap between the energized stator pole 30 and the rotor pole 62. The attractive force may cause the rotor pole 62 to approach the stator pole 30 in a clockwise direction indicated by arrow 92.

Figure 3F:
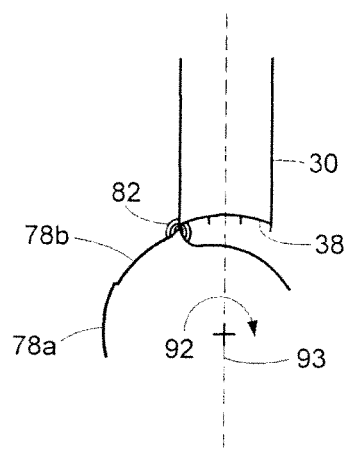
FIGS. 3F and 3G are partial views of a rotor pole of the motor shown in FIG. 1 as the it approaches the stator pole in a clockwise direction.
Figure 3G:
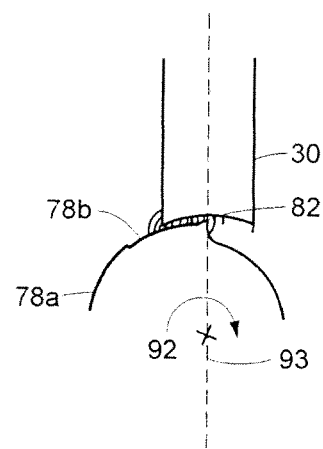

Referring to FIGS. 3F-3G, partial views of a rotor pole 62 of the rotor 16 of FIG. 3D are shown in a plurality of angular positions associated with one phase cycle. More specifically, FIGS. 3F-3G are partial views of the rotor pole 62 of the rotor 16 as the rotor pole 62 approaches the stator pole 30 in a clockwise direction indicated by arrow 92. For purposes of discussion, a stator pole reference line 93 is shown in FIGS. 3F-3G.

FIG. 3F shows the position of the rotor 16 near the beginning of a phase cycle. As shown in FIG. 3F, the air gap 80 between the protrusion 82 located at the edge of the second portion 78b of the rotor pole face 78 and the stator pole face 38 is smaller than the air gap 80 between the rest of the second portion 78b of the rotor pole face 78 and the stator pole face 38 in this position. As a result, the flux density at the air gap 80 between the protrusion 82 and the stator pole face 38 is maximized in this position, thereby causing the rotor 16 to be pulled toward the energized stator pole 30 in the direction of arrow 92.

Magnetic flux seeks the path of minimum reluctance. Therefore, because the rotor pole 62 is composed of a ferromagnetic material that has a lower reluctance than air, magnetic flux will more easily flow through the rotor pole 62 and the stator pole 30 than through the air gap 80.

FIG. 3G shows the position of the rotor 16 when the rotor 16 has been rotated in the direction of arrow 92 such that the end of the protrusion 82 is aligned with the stator pole reference line 93. After the protrusion 82 passes the stator pole reference line 93, the rotor 16 will tend to be pulled in the opposite direction of rotation, i.e., a counter-clockwise direction in this embodiment. However, this pulling in the opposite direction of rotation is offset by the positive motoring torque due to the first portion 78a of the rotor pole face 78. Therefore, the rotor 16 continues to be pulled toward the energized stator pole 30 in the direction of arrow 92.

For proper operation of the motor 10, switching should be correctly synchronized to the angle of rotation of the rotor 16. The performance of a switched reluctance motor depends in part, on the accurate timing of phase energization with respect to rotor position. Detection of rotor positions in the present embodiment is sensed using a rotor position sensor in the form of an opto-sensing assembly or optical interrupter, an embodiment of which is further illustrated and discussed with respect to FIGS. 6, 8A and 8B.

Operation of the Control Circuit

Figure 6:
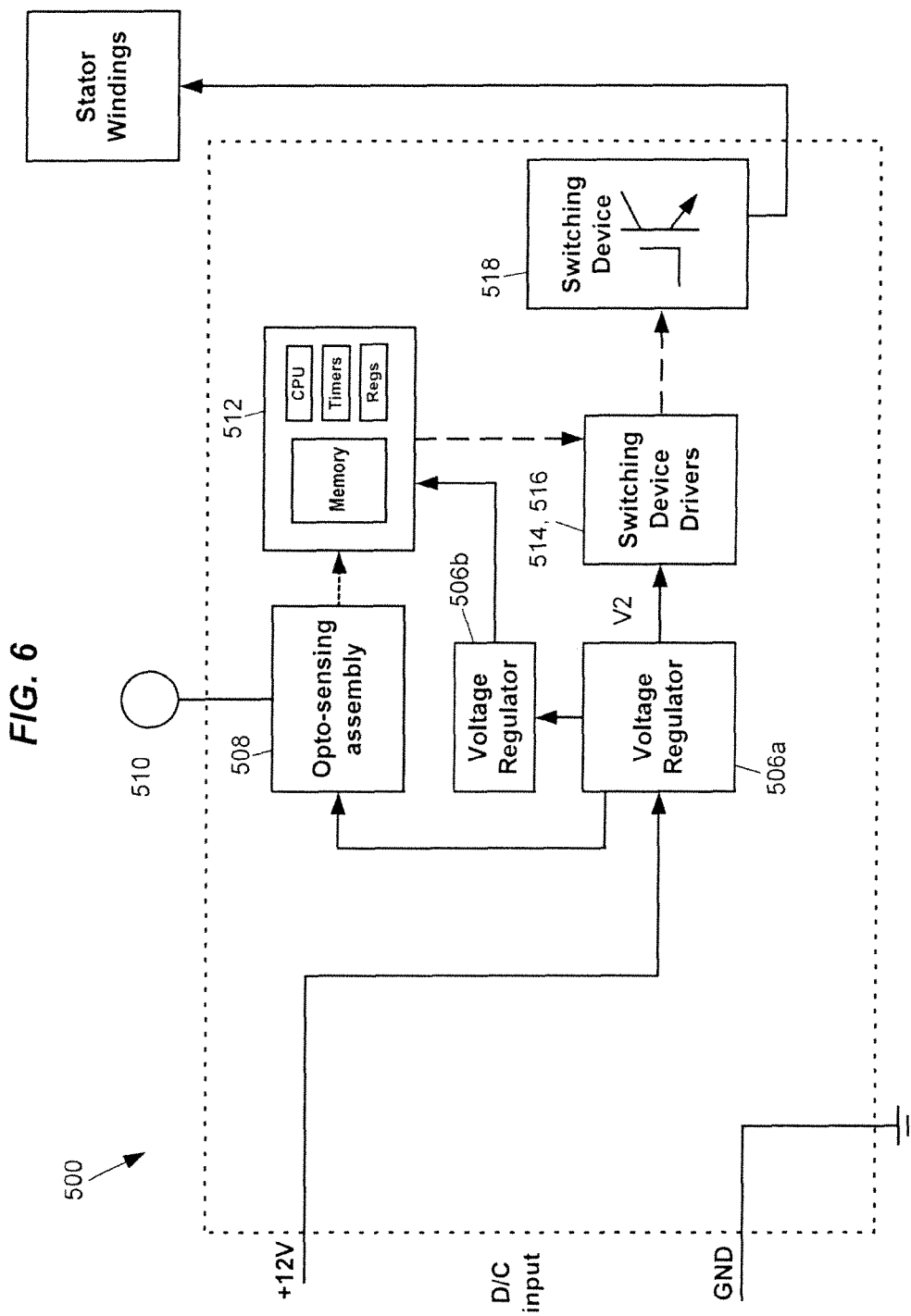
FIG. 6 illustrates a block diagram of a control circuit for the switched reluctance motor.

A drive assembly is used to drive the motor that includes a control circuit 500, which is further described below in FIG. 6. Specifically, FIG. 6 illustrates a block diagram of the control circuit 500 used to control the operation of the motor, by controlling the power supply to the stator windings. The control circuit 500 includes a DC input power which is fed to the stator windings via a switching device 518, as discussed below. The DC power is also fed to voltage regulator circuits 506a and 506b and to a micro-controller 512.

In some embodiments, the DC power may be received directly by the control circuit 500 from a battery or other electrical power storage device that is used by the vehicle to start or crank the vehicle's engine. Alternatively or additionally, the DC power may be received from an alternator or other device that is configured to charge the battery or the electrical power storage device of the vehicle. Embodiments of the control circuit and the motor of the integrated vacuum assembly may be used in conjunction with a battery, an electrical power storage device, an alternators and/or a charging device in any type of vehicle in which an integrated vacuum assembly is desired simply by providing a direct connection between the integrated vacuum assembly and the vehicle's battery, electrical power storage device, alternator and/or charging device. Typically, the received DC power may in the range of 9 to 12 Volts DC and may draw a maximum current of 36 amps.

The opto-sensing assembly 508 includes an encoder/optical sensor 510 that operates in conjunction with a slotted disk, which is rotatable with the rotor, to monitor the rotational speed of the motor. The opto-sensing assembly 508 generates a rotor position signal that is used by the micro-controller 512 to measure the position and speed of the rotor. The micro-controller 512 may include one or more of the commonly known components such as memory, a CPU, a plurality of registers, a plurality of timers, etc. One of ordinary skill in the art will appreciate that other commonly known mechanisms can be alternatively used to measure the rotor speed and/or position.

The voltage regulator 506a generates a regulated output voltage V2 that is input to switching device drivers 514 and 516, which control a switching device 518. The switching device 518 is used to control voltage input to the stator windings. The switching device 518 may be implemented by a number of electronic switching mechanisms, such as transistors, thyristors, etc. An implementation of the switching device 518 using field effect transistors (FETs) is illustrated in further detail in FIG. 7 below. The switching device 518 receives power and provides the power to the stator windings per the control signals received from the switching device drivers 514 and 516. Functioning of the switching device 518 to control stator windings is well known to those of ordinary skill in the art. Various components of the control circuit 500 are illustrated in further detail in FIG. 7 below.

While the control circuit 500 receives DC input power of 9-16 Volts DC, in an alternate implementation, a different level of input power may be selected. For example, it may be desired that the voltage not exceed 14 volts, but an alternator diode failure could cause voltage spikes up to 16 volts. The current may also be monitored to ensure that it stays below a threshold value, such as, for example, 36 Amps.

The input is connected via 3.3 volt regulator 506b, which is supplied by 10.5 volt regulator 506a, to the microcontroller 512. The microcontroller 512 may be implemented by using any of the various microcontroller integrated circuits, such as a Z86 type of integrated circuit. The microcontroller may also be an 8-bit microcontroller and may include a phase control circuit, a high frequency oscillator for high resolution, a thermistor circuit for temperature monitoring as a safety feature and various peripheral circuits for operator interface and sensing.

Figure 7:
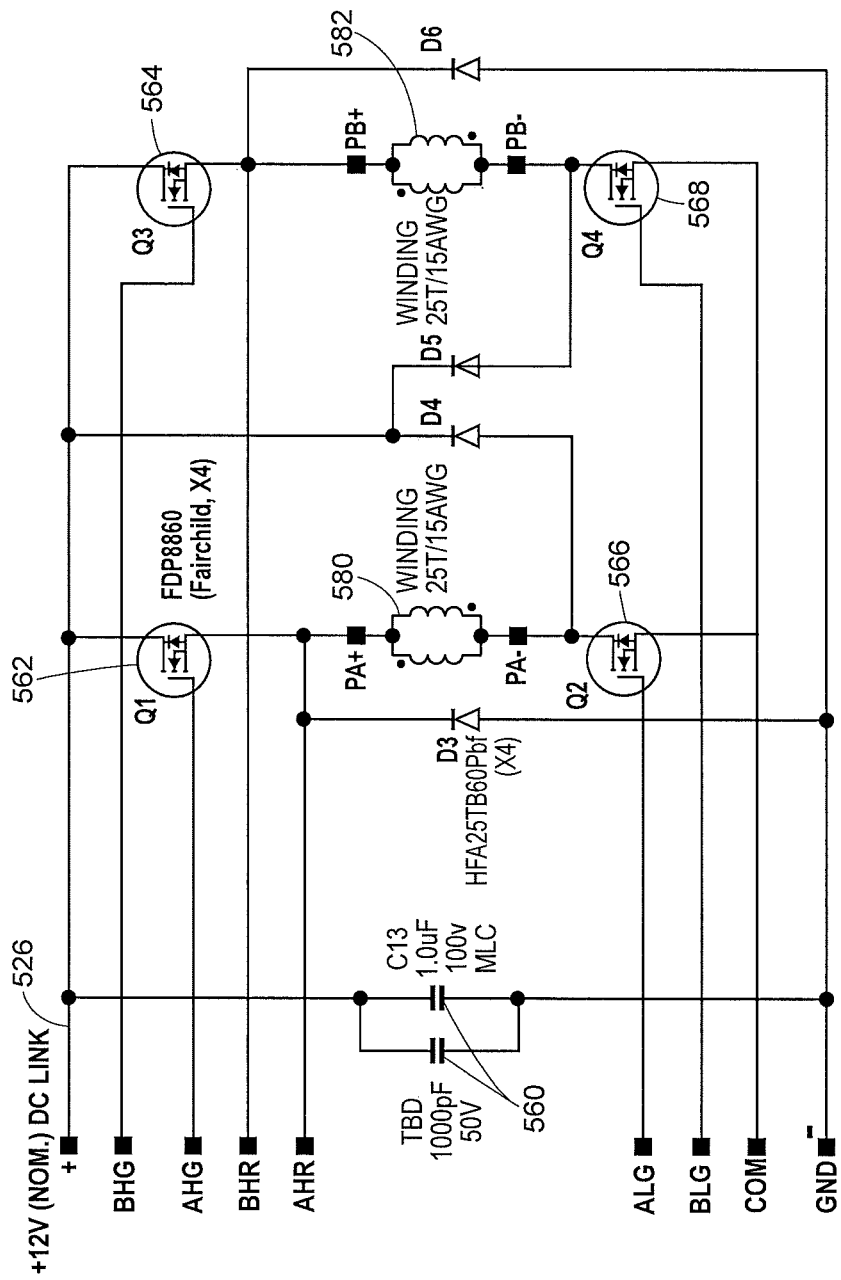
FIG. 7 illustrates a circuit diagram of the control circuit corresponding to the block diagram of FIG. 6.

FIG. 7 illustrates an implementation of the control circuit 500 wherein the switching device 518 is implemented by FETs 562-568. The FETs 562-568 control the current passing through a first phase 580 and the second phase 582 of the stator windings. The FETs 562 and 564 are connected to the high voltage end of the first phase 580 and the second phase 582, respectively, and are known as the high side FETs, while the FETs 566 and 568 are connected to the low voltage end of the first phase 580 and the second phase 582, respectively, and are known as the low side FETs. The FETs 562-568 receive their control input signals AHG, ALG, BLG and BHG from the switching device drivers 514 and 516. In an implementation of the control circuit where the switching device 518 is implemented by the FETs 562-568, the switching device drivers 514 and 516 may be implemented by using one of the many well known integrated FET driver circuits, such as FAN7382 integrated circuit, available from Fairchild.

The first switching device driver 514 generates a high side output AHG and a low side output ALG to drive the first phase 580. Specifically, the high side output AHG is used to drive the high side FET 562 and the low side output ALG is used to drive the low side FET 566. The second switching device driver 516 generates a high side output BHG and a low side output BLG to drive the second phase 582. Specifically, the high side output BHG is used to drive the high side FET 564 and the low side output BLG is used to drive the low side FET 568.

In an implementation of the control circuit, the turning on and off of the FETs 562-568 is controlled to allow current generated in the stator windings due to magnetic collapse to drain out before the next commutation. For example, FETs 562 and 566 are turned off simultaneously to allow current in the windings to collapse and reverse. This reversed current is then conducted back into the DC bus via flyback diodes D3-D6. Phase current dumping occurs in one phase during the time the opposite phase is energized.

The input voltage 526 is applied to a plurality of capacitors connected in parallel (1500 uF for example) to filter out voltage ripple on the DC bus produced by switching of the FETs. The resulting filtered voltage is 12 volts DC under load, and can source up to 36 amperes of continuous current. Capacitors 560 are provided to remove high frequency switching noise that could cause electromagnetic interference to other devices.

As shown in FIG. 7, the resulting DC bus voltage from the filter capacitors is applied directly to the drains of series switching FETs 562 and 564, and to the sources of series switching FETs 566 and 568. The FETs 562-568 receive their gate inputs from the switching device drivers 514 and 516.

Figure 8A:
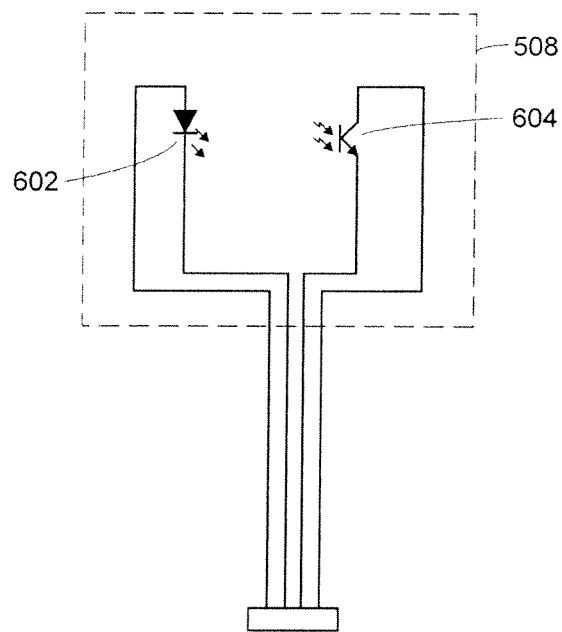
FIG. 8A illustrates a circuit diagram of an optical sensor assembly used in the control circuit of FIG. 6.

FIG. 8A illustrates a circuit diagram of the opto-sensing assembly 508. In some embodiments, the opto-sensing assembly 508 may be implemented by a conventional optical sensor assembly, such as Honeywell P/N HOA1887-011 from Honeywell, Inc., or Optek P/N OPB830W11 from Optek, Inc. In other embodiments, instead of utilizing an "all-in-one" injection molded photosensor system, the opto-sensing assembly 508 may be implemented by a more cost-effective alternative, such as securing a stamped aperture assembly to an off-the-shelf IR emitting component and/or an off-the-shelf IR detecting component. Of course, other embodiments of the opto-sensing assembly 508 may also be possible and may be used in conjunction with the present disclosure.

Generally, the opto-sensing assembly 508 may include a light emitting diode (LED) 602 and a silicon photo-transistor 604, where the LED 602 receives a DC voltage from the voltage regulator 506a. The LED 602 and photo-transistor 604 may be placed on opposite sides of the slotted disk 71, which is attached to the rotor 16 (FIG. 3C), and therefore rotates at the speed of the rotor.

As previously discussed, switched reluctance motor operation is based on a tendency of a rotor to move to a position where an inductance of an energized phase of stator winding (s) is maximized. In other words, the rotor will tend to move toward a position where the magnetic circuit is most complete. The rotor has no commutator and no windings and is simply a stack of electrical steel laminations with a plurality of opposed pole faces. It is however, necessary to know the rotor's position in order to sequentially energize phases of the stator windings with switched direct current (DC) to produce rotation and torque.

For proper operation of the motor, switching should be correctly synchronized to the angle of rotation of the rotor. The performance of a switched reluctance motor depends in part, on the accurate timing of phase energization with respect to rotor position. Detection of rotor positions in the present embodiment is sensed using a rotor position sensor in the form of the opto-sensing assembly or optical interrupter 508.

Each time the edge of the slotted disk 71 passes between the LED 602 and the photo-transistor 604 of the optical interrupter 508, the signal generated by the photo-transistor 604 changes from one level or state to another. The signal output from the photo-transistor 604 is input to the micro-controller 512. The micro-controller 512 calculates the speed and the position of the rotor based on the duration of the previous period. Calculation of the speed of the rotor using the time period for each rotation of the rotor is conventional and therefore is not further described. The micro-controller 512 uses the speed and the position of the rotor 16 to coordinate sequential phase energization of the stator windings 32 (e.g.

switching events). Details of the sequential phase energization are described in a subsequent section.

Figure 8B:
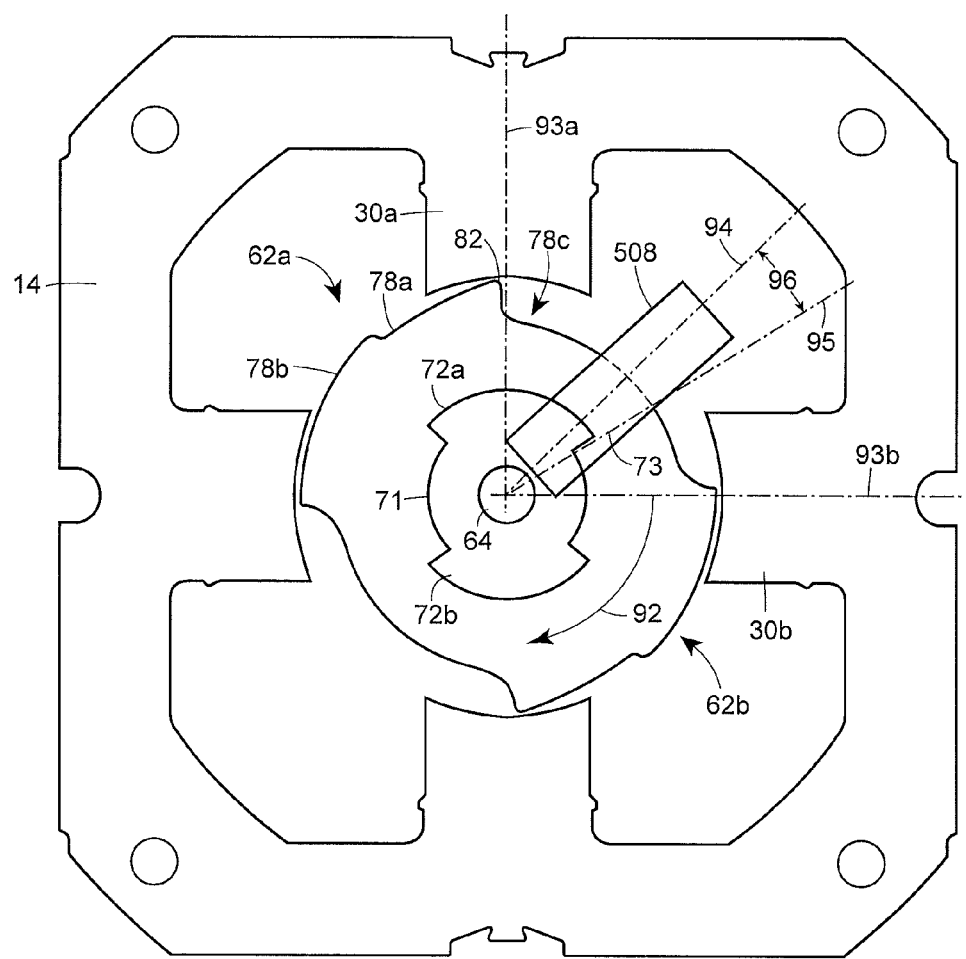
FIG. 8B depicts an exemplary alignment between the rotor and the slotted disk of the motor of FIGS. 3B and 3C.

Typically, the optical interrupter 508 may be positioned between two stator poles of different phases (e.g., the stator poles 30a and 30b of FIG. 3E). The slotted disk or encoder 71 may be mechanically disposed with respect to the rotor 16 so that as the rotor 16 and the slotted disk 71 rotate, a leading edge of the slotted disk 71 may be aligned with and trigger the optical sensing assembly 508. Upon triggering, the optical sensing assembly 508 may send a corresponding signal to the control circuit 500 or to the micro-controller 512, that may, in turn, result in an energization of a trailing stator pole (with respect to the optical sensing assembly 508) to induce an attraction of a trailing rotor pole. FIG. 8B illustrates an example of this alignment relationship between the slotted disk 71 and the rotor pole 62a. FIG. 8B includes therein the rotor 16 and the stator 14 of FIGS. 3A-3G. For clarity of illustration, however, only a subset of reference numbers from FIGS. 3A-3G are transposed to FIG. 8B.

FIG. 8B includes the rotor 16 with the rotor poles 62a and 62b and the rotor shaft 64. The rotor pole 62a may include first 78a and the second 78b portions of the rotor pole face 78 as well as the protrusion 82 at the leading edge of the rotor pole 62a.

The optical sensor assembly 508 may be disposed between a leading stator pole 30b and a trailing stator pole 30a. In some embodiments, the optical sensor assembly 508 may be attached to the upper housing unit 12 and disposed thereon so that when the upper housing unit 12 is secured to the stator 14, the optical sensor assembly 508 may be positioned between the two stator poles 30a and 30b. An optical interrupter reference line 94 is provided to show the angular position at which the optical interrupt may be triggered. In some embodiments, the optical interrupter reference line 94 may bisect an angle formed by a stator pole reference line 93a of the trailing stator pole 30a and a stator pole reference line 93b of the leading stator pole 30b (stator pole reference lines were previously described with respect to the reference line 93 of FIG. 3F and 3G).

FIG. 8B further illustrates the alignment of the slotted disk 71 with respect to the rotor pole 62a. The slotted disk 71 may be rotatable with the rotor 16 in the direction 92. In one embodiment, the slotted disk 71 may be mechanically disposed on an end of the shaft 64 in a pre-determined alignment with the rotor poles 62a and 62b. For example, the end of the rotor shaft 64 and a central aperture of the slotted disk 71 may have a same shape (not shown) so that the slotted disk 71 may be securely engaged via the central aperture on the end of the rotor shaft 64 in the pre-determined alignment. The slotted disk 71 may include a plurality of equally spaced lobes 72a and 72b, where the lobes 72a and 72b may pass between the LED 602 and the photo-transistor 604 to trigger the optical sensor assembly 508.

A leading edge 73 of the lobe 72a of the slotted disk 71 is illustrated as being phase advanced with respect to the optical interrupter reference line 94, as indicated by advance reference line 95 and advance angle 96. The mechanical phase advance 95 and 96 of the slotted disk 71 is necessary to ensure proper start-up of the motor 10 irrespective of a starting rotor position. For example, if the mechanical phase advance 96 is 0° (i.e., instead of the alignment shown in FIG. 8B, the leading edge 73 of slotted disk 71 is aligned with the optical interrupter reference line 94 when the protrusion 82 of the rotor pole 62a is aligned with the stator reference line 93a), the motor 10 may not start up properly as the leading edge 73 of the slotted disk 71 may be just shy of the optical interrupter reference line 94 and may not trigger the optical sensing assembly 508, resulting in a failure to energize the trailing stator 30a.

With a positive mechanical phase advance 96, however, this start-up problem may be overcome. For example, with the positive phase advance 96 at start-up, the leading edge 73 of the slotted disk 71 may be detected by the optical interrupter 508 when the starting position of the leading edge 82 of the rotor pole 62a is just shy of the stator reference line 93a. The detection of the leading edge 73 at start-up may trigger the optical interrupter 508, and may result in an energization of the trailing stator pole 30a to attract the rotor pole 62a to rotate in the direction 92. In this manner, the phase advance as illustrated by references 95 and 96 enable the motor 10 to start up properly irrespective of a start position of the rotor pole 62a. The mechanical advance 95 and 96 may result in the slotted disk-driven switching events to occur n advance of the point of maximum, aligned inductance.

For a motor that produces a similar power as the motor of the present disclosure, but that receives converted 120 volt AC power, a positive mechanical phase advance 95 and 96 in a range of 3-5° may sufficient. The motor 10 of the integrated vacuum cleaner system 100 for vehicles, however, may not receive a standard converted 120 volts AC, but instead may receive an input voltage (such as the input voltage 526 of FIG. 7) of approximately 12 volts DC under load directly from a battery or other electrical power source of the vehicle into which the vacuum cleaner system 100 is integrated. As the input voltage delivered to the motor 10 may vary based on vehicle conditions, the motor 10 may be configured to operate at varying levels of input voltage, generally between 9 volts DC and 16 volts DC. The motor 10 may also be configured to provide sufficient power for a vacuum/suction sealed lift of at least 40 inches of water. The relatively low input voltage received by the motor 10 compared to the relatively high amount of power provided by the motor 10 may require the advance position of the encoder 71 to be increased over that of a motor that provides similar power but receives a higher input voltage (e.g., a converted 120 volts AC).

As previously discussed, for a motor that receives standard converted 120 volt AC power, the slotted disk 71 may be advanced by about 3-5° with respect to the rotor/stator aligned position. In contrast, in an exemplary embodiment of the motor 10 of the integrated vacuum cleaner system 100 for vehicles, the slotted disk may be advanced by around 10° with respect to the rotor/stator aligned position. This increase in phase advance accommodates the lower voltage (e.g., 9-16 volts DC) received by the motor of the integrated vacuum system, while enabling an overall suction power of the integrated vacuum system to remain relatively high (e.g., a suction lift greater than a minimum of 40 inches of water). As illustrated by FIG. 8B, the increased phase advance may result in the optical sensing assembly 508 triggering while an air gap between the trailing stator pole 30a and the rotor 16 is greater, e.g., while a section 78c of the rotor core 60 is aligned with the trailing stator reference line 93a. The larger air gap may result in less inductance in a coil of the stator pole 30a, and energizing current may enter the coil of the stator pole 30a more quickly. The inrush of current into the stator pole 30a may produce a torque of a sufficient magnitude so as to induce the rotor pole 62a to rotate in the direction 92. In this manner, the greater phase advance may allow the power of the integrated vacuum system to be maintained even though the input voltage to the motor 10 of the integrated vacuum system is relatively low.

Figure 8C:
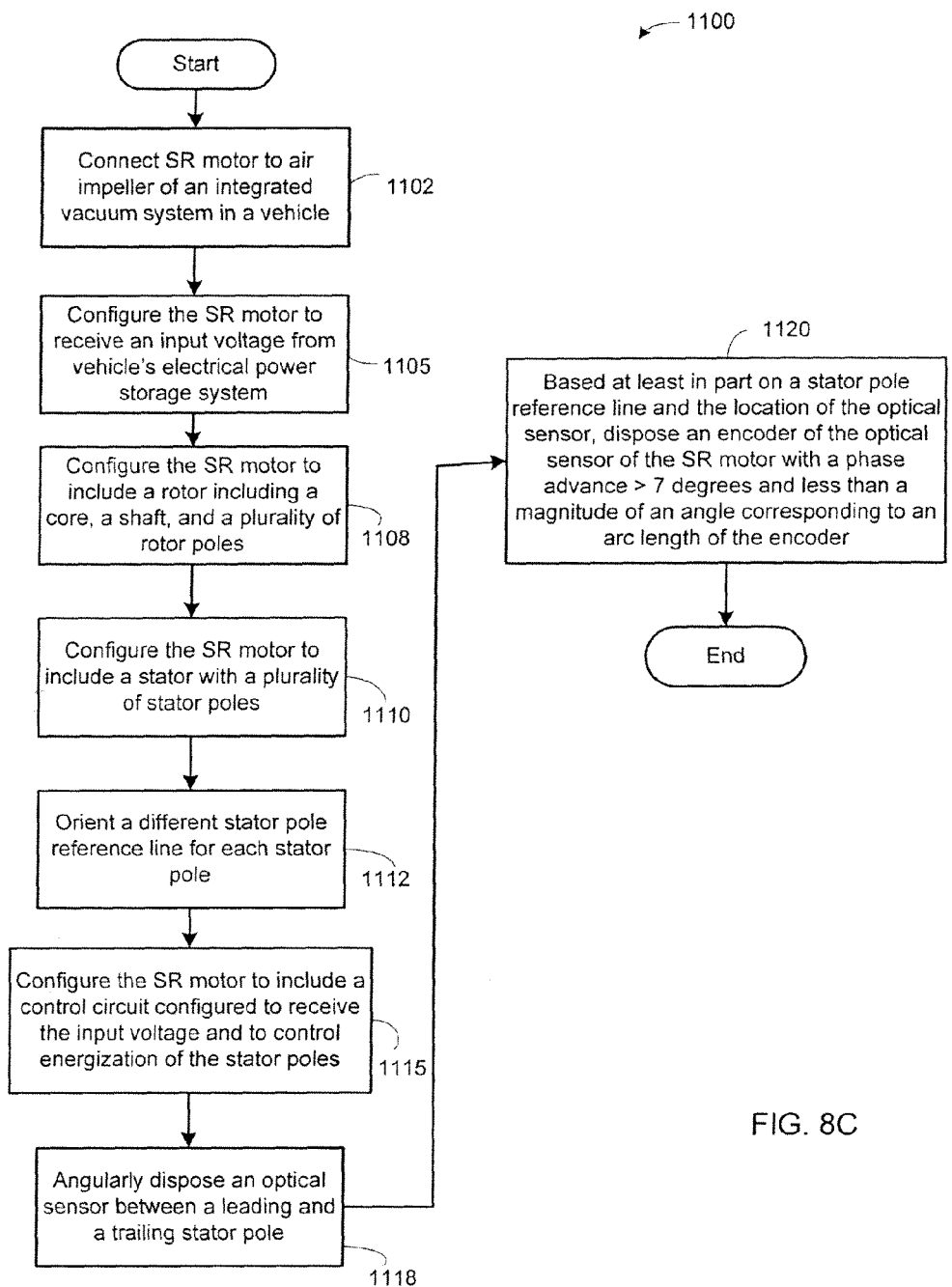
FIG. 8C depicts an exemplary method of ensuring a start-up of a switched reluctance (SR) motor.

FIG. 8C depicts an exemplary method 1100 of ensuring a start-up of a switched reluctance (SR) motor. Embodiments of the method 1100 may be used in conjunction with any of the embodiments disclosed herein, and in particular with FIGS. 3A-3G and FIGS. 8A and 8B.

At the start, the method 1100 may connect (block 1102) the switched reluctance motor to an air impeller of an integrated vacuum system in a vehicle, such as the air impeller 210 of the integrated vacuum system 100. At block 1105, the SR motor may be configured to receive an input voltage from the vehicle's electrical power storage system. The vehicle's electrical power storage system may be, for example, a battery, an alternator, and/or equivalent. Typically, the received input voltage may be in a range of 9-16 Volts DC, and the SR motor may draw a maximum current of 36 amps.

At block 1108, the SR motor may be configured to include a rotor. The rotor may include a rotor core, a rotor shaft, and a plurality of rotor poles. At block 1110, the SR motor may be configured to include a stator having a plurality of stator poles. The stator may fixedly surround the rotor. At the block 1112, a different stator pole reference line for each stator pole may be oriented. Each stator pole reference line may bisect the rotor shaft and a corresponding stator pole. The rotor, the stator and the stator pole reference lines may be similar to those previously described in FIGS. 3A-3G.

At the block 1115, the SR motor may be configured to include a control circuit, such as the control circuit 500 or the micro-controller 512. The control circuit may receive the input voltage from the electrical power storage system of the vehicle, and may control energization of the stator poles in a determined manner.

At the block 1118, an optical sensor or optical sensing assembly may be angularly disposed between a leading and a trailing stator pole. The optical sensor may be similar to the optical sensor described with respect to FIGS. 8A and 8B, for example. The optical sensor may be triggered to signal the control circuit by a slotted disk or encoder that is rotatable in conjunction with the rotor.

At the block 1120, the slotted disk or encoder may be mechanically phase advanced with respect to the rotor. In some embodiments, the phase advance of the slotted disk or encoder may result in a leading edge of a lobe of the slotted disk/encoder triggering the optical sensor prior to an alignment of a trailing (with respect to the optical sensor) rotor pole of the rotor with a stator pole reference line of a trailing stator pole. The phase advance may greater than seven degrees and may be less than a magnitude of an angle corresponding to an arc length of the lobe of the encoder. In a preferred embodiment, the magnitude of the phase advance may be between 9-11 degrees. As previously discussed with respect to FIG. 8B, the phase advance may ensure a proper start-up of the switched reluctance motor.

Figure 9:
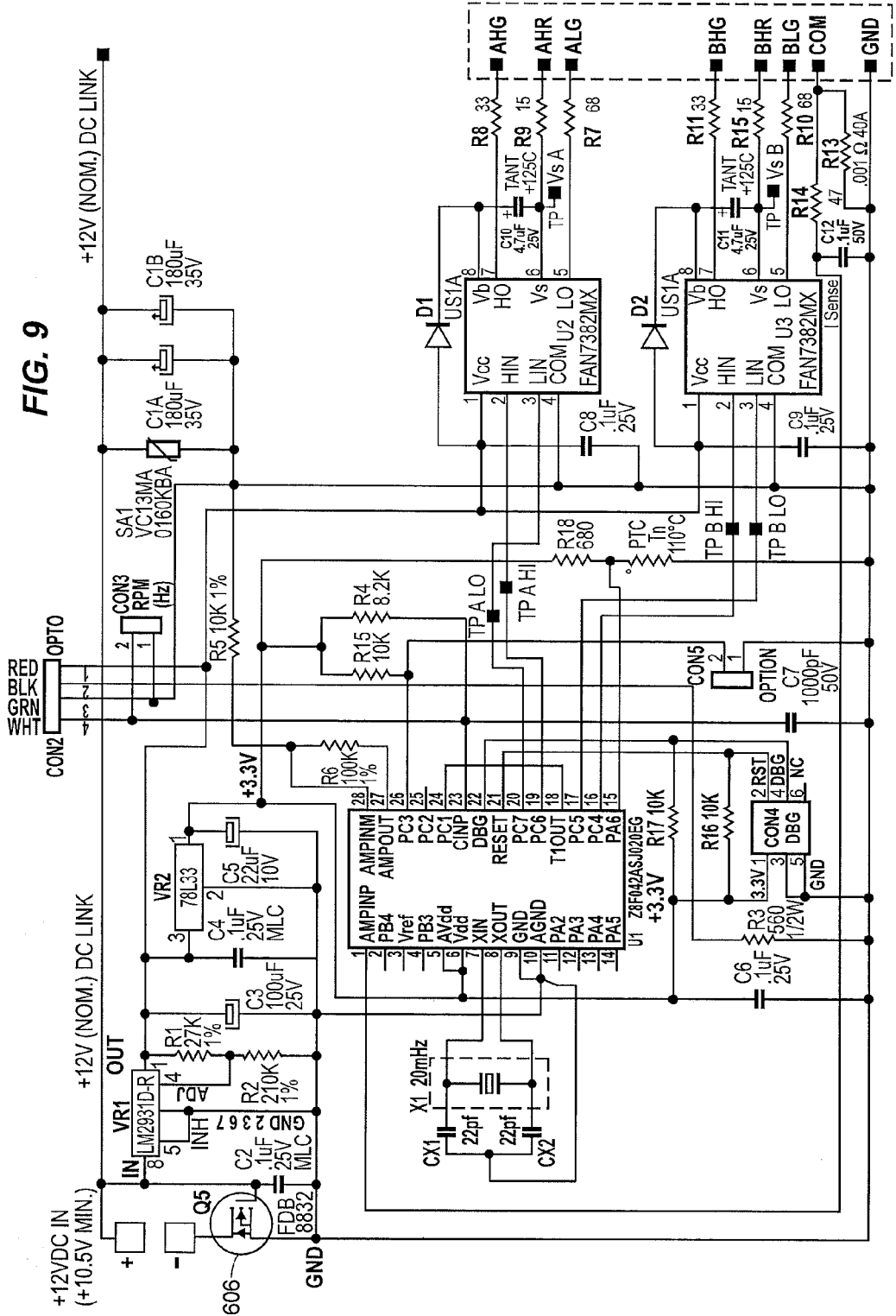
FIG. 9 illustrates an exemplary circuit diagram of the control circuit.

FIG. 9 illustrates an exemplary circuit level diagram of the micro-controller 512 and various peripheral components. The circuit includes an FET 606 connected between the high side and low side of the input power to prevent damage to the circuit if the assembly's power connectors are connected backwards. While the connector is keyed, it is still possible that the contacts leading to the connector could be assembled incorrectly during manufacturing. The FET 606 also prevents damage to the circuit if the auto's battery is connected incorrectly or if the auto is jump started incorrectly. If the power input is somehow connected backwards, there will be no gate voltage for FET 606, thus preventing the backward voltage from passing any further in the circuit.

Figure 10:
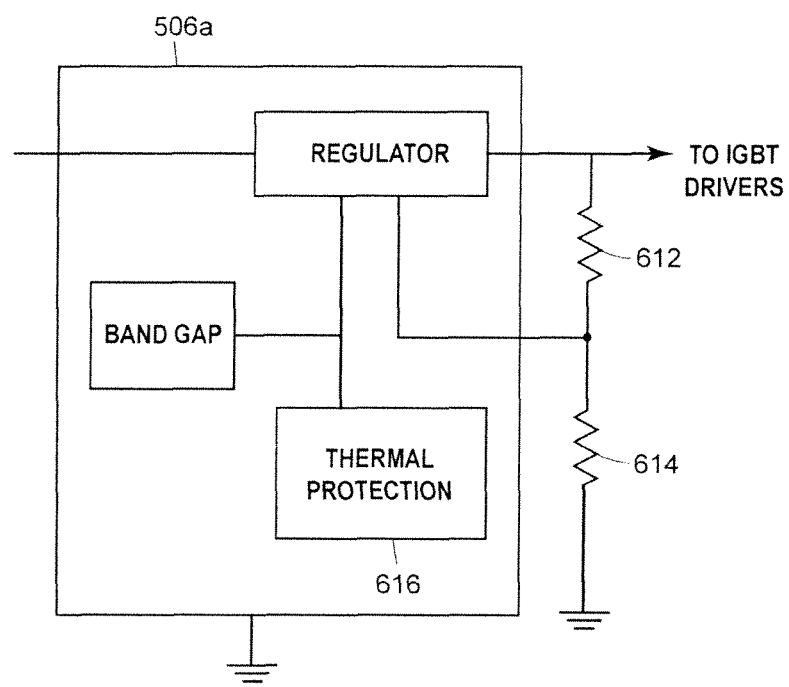
FIG. 10 illustrates a block diagram of a voltage regulator used in the control circuit of FIG. 6.

FIG. 10 illustrates an exemplary implementation of the voltage regulator 506a. In this illustration, the voltage regulator 506a is implemented using integrated circuit LM2931 from ST Microelectronics, however in alternate implementations, similar voltage regulators may also be used. The voltage regulator 506a is supplied DC voltage from the vehicle's alternator/primary battery. The output voltage of the voltage regulator 506a can be adjusted by means of an external resistor divider comprising the resistors 612 and 614.

Due to the functioning of the motor, as well as due to the continuous operation of the control circuit 500, it is quite possible that the temperature of the control circuit 500 may rise substantially. To avoid any damage to the control circuit 500 and various components located upon it, the control circuit 500 is designed with a thermal shutdown feature.

The FETs 562-568 are qualified to be operable up to a temperature of 175° C. To prevent overheating, they are placed such that they are cooled by the air circulated by the motor. However, if for some reason such as obstruction, housing failure, etc., the cooling air to the FETs 562-568 is lost, the temperature of the control circuit could rise up to 150° C. FETs 562-568 are mounted to an aluminum heat sink to dissipate heat generated during operation. The heat sink temperature is monitored via NTC thermistor 616. When the heat sink temperature rises above about 120° C. the thermistor output will transition signaling the microcontroller to stop providing output to the switching device drivers. This will stop the rotation of the motor. However, as described below, the power to the micro-controller 512 remains on.

The restart of the motor, in the event of such a thermal shutdown, is further explained by the flowchart 650 of FIG. 11. Blocks 652 and 654 illustrate constant monitoring of the temperature of the heat sink by the thermistor 616. As long as the temperature of the heat sink is below a threshold level, the thermal protection device will continuously monitor the heat sink.

When it is detected that the temperature of the heat sink is at or above the threshold level, the NTC thermistor 616 signals the microcontroller to stop rotation of the rotor. In some other arrangements, if the power switch of the motor is left on, the motor could re-start unexpectedly once the thermal protection device 616 senses that the temperature of the heat sink is below threshold. However, in the present system, because the microcontroller 512 never lost power, it will not be in proper start-up mode to permit such unexpected restart of the motor.

At a block 662, the microcontroller 512 generates a troubleshooting error code that can be used later by the manufacturer or the operator of the motor for diagnostic purposes. Subsequently, as shown by the block 664, the microcontroller 512 will not restart until the entire operation of the motor is recycled, that is, the on/off switch of the motor has been turned off and then on. Once the recycling of the motor is detected, at a block 666 the microcontroller 512 resumes the operation of the motor in a normal start mode, which is described in further detail below.

Operation of the Motor Code

Conventional switched reluctance motors utilizing a microcontroller to control the commutation of power provided to the stator windings perform the same start-up routine whenever power to the circuit is turned on. However, if the power to the motor is turned off when the rotor is rotating at a high rate of speed and then quickly cycled back on (i.e., rapid cycling), using the same start-up routine could cause damage to occur to the electrical components in the motor. Typically, it is the FETs in the circuit that are most susceptible of damage if the motor is not allowed to coast for a period of time until the rotational speed falls below a threshold speed. A running restart routine is described below to detect such a rapid cycling of power and to allow the rotor to coast until the rotation speed falls below a threshold speed in order to prevent damaging the FETs.

As previously discussed, switched reluctance motor operation is based on a tendency of a rotor to move to a position where an inductance of an energized phase of stator winding (s) is maximized. In other words, the rotor will tend to move toward a position where the magnetic circuit is most complete. The rotor has no commutator and no windings and is simply a stack of electrical steel laminations with a plurality of opposed pole faces. It is however, necessary to know the rotor's position in order to sequentially energize phases of the stator windings with switched direct current (DC) to produce rotation and torque.

For proper operation of the motor, switching should be correctly synchronized to the angle of rotation of the rotor. The performance of a switched reluctance motor depends in part, on the accurate timing of phase energization with respect to rotor position. Detection of rotor positions in the present embodiment is sensed using a rotor position sensor in the form of the opto-sensing assembly or optical interrupter 508.

One manner in which an exemplary system may operate is described below in connection with FIGS. 12A and 12B which represent a number of portions or routines of one or more computer programs. The majority of the software utilized to implement the routines is stored in one or more of the memories in the controller 512, and maybe written at any high level language such as C, C++, C#, Java or the like, or any low-level assembly or machine language. By storing the computer program portions therein, those openingions of the memories are physically and/or structurally configured in accordance with computer program instructions. Parts of the software, however, may be stored and run in a separate memory location. As the precise location where the steps are executed can be varied without departing from the scope of the invention, the following figures do not address the machine performing an identified function.

Figure 12A:
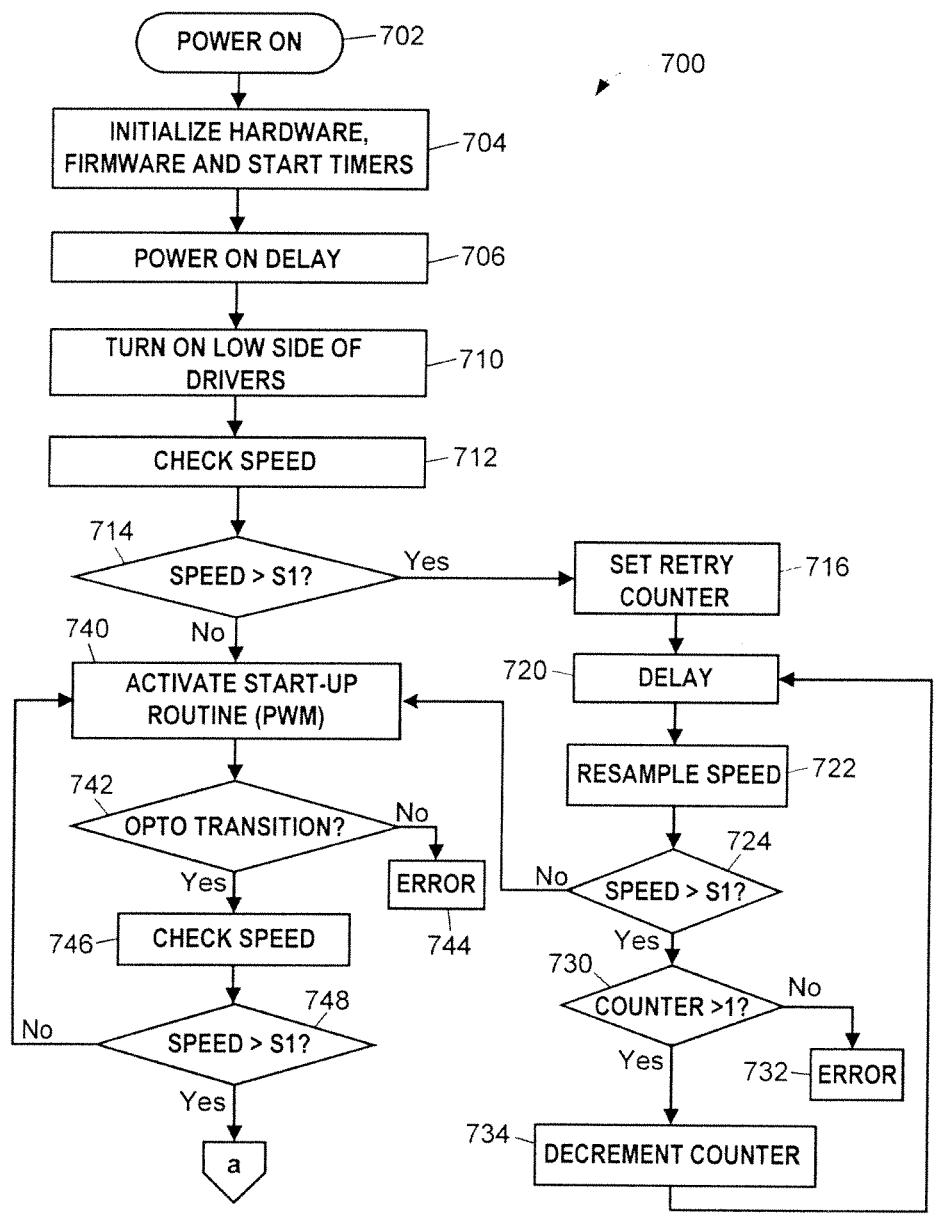
FIGS. 12A and 12B illustrate some of the steps used to synchronize the switching or commutation of the power provided to the stator windings.
Figure 12B:
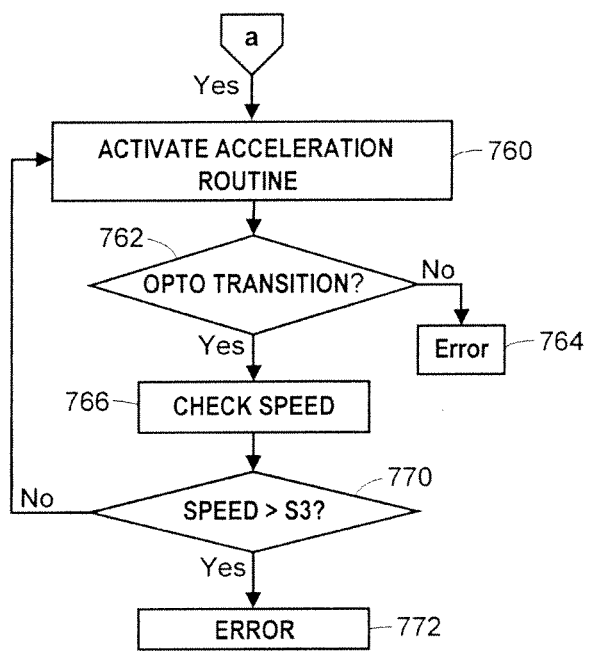

FIGS. 12A and 12B are two parts of a flowchart 700 describing some of the steps used to synchronize the switching or commutation of the power provided to the stator windings. Some, or all, of the steps shown on the flowchart 700 may be stored in the memory of the controller 512.

Referring to FIG. 12A, the flowchart 700 may begin when power is provided to the control circuit (block 702). This begins the initialization phase, and includes initializing the hardware, firmware, and start timers (block 704). Specifically, the initialization includes a series of inline initialization instructions that are executed every power on. The initialization may be further broken down into hardware initialization, variable initialization, and power on delay.

Upon power on, program execution begins within the controller 512 at a specific memory location. In essence, the hardware initialization includes a series of instructions that configure the controller 512 by assigning and configuring I/O, locating the processor stack, configuring the number of interrupts, and starting a plurality of period timers. The variable initialization includes installing sane default values to a number of variables, one of which is a speed dependant correction variable. Once initialized, the temperature of the controller 512 is tested. This is a redundant safety check because there is normally no appreciable current on the control board that would allow for heating. If a temperature fault is detected, the fault is logged into an NVDS and a system power down is required to reset the fault.

When the initialization is complete, the micro-controller 512 starts the operation of the motor and executes the code that monitors and controls the system. Initially there is a delay of 420 mS that is created by using a timer for the purpose of providing a buffer between the time that power is applied and the start of the motor. Additionally, there is a 100 mS power on delay (block 706), which gives the bootstrap power supply capacitors time to charge most of the way before the drivers are turned on. This prevents the application of insufficient gate voltage to the high side gate at initial turn-on. During this time delay, the low side of the FET drivers are turned on to charge the bootstrap capacitors (block 710). After using the timer for the bootstrap delay, it is reconfigured by the code to monitor the time between pulses of the falling edge of the encoder signal.

In operation, the controller 512 utilizes two different speed routines, namely start-up and acceleration. However, immediately after initialization, the controller 512 will determine a rotational speed of the rotor by polling the opto-sensing assembly 508 in order to deter nine if the running re-start routine is needed before activating the slow mode (block 712). If it is determined at the block 714 that the rotor speed is greater than a predetermined value S1, such as for example, 9191 RPM, the routine 700 will jump to a running re-start mode which is utilized to prevent damage to the FETs and drivers after a rapid cycling of current provided to the motor. The rapid cycling of power to motor is essentially a quick off/on while the motor is already spinning. The running re-start routine is utilized to prevent damage to the FETs and drivers 514, 516, as cycling the power above certain speeds may confuse the start-up routine (described below) and possibly blow one or more of the FETs 562-568. The running re-start routine is used after a rapid cycling of power to initiate a delay that allows the rotational speed of the rotor to decrease to a point where the firing angles, as calculated by the controller 512, are fixed.

From a running re-start routine, if it is determined at the block 714 after power on that the speed is greater than 9191 RPM, a retry counter is set (block 716), for example. It should be noted that the retry counter may alternatively be set upon initialization, or may be set at another point in the running re-start routine. A predetermined time delay, such as 500 mS, may then be initiated (block 720). The rotational speed of the rotor is than re-sampled (block 722). If it is determined at a block 724 that the rotational speed of the rotor 16 is still greater than the predetermined threshold S1, the routine will then check at a block 730 to determine the value of the retry counter.

If it is determined at the block 730 that the retry counter is not greater than 1, then an error maybe generated (block 732) and the system may be shut down. In other words, this would occur when the retry counter has counted down consecutively from 20 to 1. This would indicate that a predetermined time period would have passed. If it is determined at the block 730 that the retry counter is greater than 1, than the retry counter is decremented (block 734) and the routine returns to block 720 where another delay is initiated.

If it is determined that the block 724 at the rotational speed of the rotor was less than the threshold S1, then the routine will jump to activate the start-up routine (block 740). In other words, in the disclosed embodiment, the rotational speed of the rotor continues to be re-sampled for a predetermined time if the re-sampled rotational speed continues to exceed the threshold S1. Those of ordinary skill in the art will readily appreciate that alternative methods of checking to ensure that the rotational speed of the rotor has decreased to a safe level before jumping to the start-up routine can be implemented. For example, a longer delay may be implemented in which the need to utilize the retry counter maybe eliminated. A variety of other techniques may also be utilized.

When the start-up routine is activated at the block 740, the controller 512 provides Pulse Width Modulation (PWM) to which ever phase of stator windings is ahead of the rotor poles during start up to avoid large current spikes as the rotor comes up to speed. The rotor position is typically known at startup from the state of the signal from the encoder/optical sensor 510. Effectively, each current pulse supplied to the stator windings is chopped into many short (duration) current pulses until the rotor speed reaches a predetermined speed. At that point, full pulses are applied to the stator windings. The optical sensor transitions are polled, triple debounced, and disabled for a minimum period of time after a previous transition in order to reduce the chances of noise on the output signal.

In start-up, the current input is duty cycled to limit the maximum FET on time in all cases. Additionally, there are two unique commutation states that reflect the present state of the optical sensor. During start-up, a counter is used to ensure that the phases of the motor are not fired while the rotor is in a locked or encumbered state. The counter is initialized for use as a time keeper for the phase control of the motor. The code passes to a sub-routine to monitor the rotor for rotation by comparing an incremented value to a constant written into the code. This limits the number of pwm pulses allowed prior to an initial transition of the encoder sensor. This ensures that the motor does not delay too long during start-up. The counter is incremented during every PWM off cycle and the current count is compared to the maximum allowable count in the start-up mode. If the count value is reached, a fault occurs. The motor is thus shut off if the rotor does not spin fast enough to update the encoder position before the maximum count is reached. This sequence of events would typically take about 0.5 seconds.

Returning to FIG. 12A, after initiating the start-up routine at block 740, the routine will then check to see if an optical transition has occurred (block 742). If no optical transition has been recorded, then an error is generated indicating a problem on start up (block 744). If it is determined at block 742 that an optical transition has occurred, the routine may check the rotational speed of the rotor (block 746). If it is determined at a block 748 that the rotational speed of the rotor is less than the predetermined threshold S1, the routine returns to the block 740 to continue executing the start-up routine. However, if it is determined that the block 748 that the rotational speed rotor is greater than the predetermined threshold S1, the routine as shown on FIG. 12B will move to activate an acceleration routine (block 760).

In the disclosed embodiment, the start-up and acceleration routines, the motor current is limited by the rms current supplied by the pulse width modulation (pwm) and the stator-rotor inductance. The duty of the pwm is typically set to about 85% with a pwm frequency of 525 Hz. This value is set to facilitate a smooth, fast start up without creating an unnecessarily high current spike when the motor starts.

After the bootstrap charge, the counter is used both for monitoring a speed threshold of 9191 rpm and the speed of the motor by resetting after each encoder falling edge. The 9191 rpm corresponds to a hex value of FF00 (65280 decimal) loaded into a timer reload register. This timer is set to one-shot mode so it will stop counting after it reaches this value and set a bit register. This bit is labeled and is routinely sampled and used to determine the current side of the speed threshold. If the bit is set, the speed is slower or equal to 9191 rpm, if not set, the speed is faster. This speed threshold is then used to toggle the electronic phase advance on and off. Phase advance is implemented above this threshold.

The encoder's falling and rising edges are filtered (debounced) and a bit labeled QUAD_A is set after a legitimate logic low. QUAD_A is reset after a legitimate logic high. The QUAD_A bit is then tested for proper phase control when the logic is high.

In the acceleration routine, an electronic phase advance is utilized above 9191 rpm. At this point, the control passes to a subroutine and a phase advance is used to optimize a torque of the motor to facilitate a smooth acceleration to a normal operating speed. This advance is controlled by a mathematical algorithm that utilizes a time between the encoder sensor's falling edges (i.e. the period) and calculates the proper amount of timer pulses necessary after a falling edge to institute and advance its firing. This algorithm may be determined using empirical data derived from plotting a maximum torque at a low operating load and a maximum torque within current limits and a high operating load. These two values are converted to a slope (m), which may be, for example, 13. The formula to determine the advance based on slope is:

$$MLA-((MLV-PERIOD)/m)=ADV$$

Where MLA is a maximum load optimum advance in a timer count value, MLV is a maximum load speed and rpm, PERIOD is a current timer count value that represents a time between falling edges, m is a slope, and ADV is the new advance as a timer count value. This simplifies to:

$$0.077*PERIOD+1821=ADV$$

Which is further simplified to:

$$79*PERIOD/1024+1821=ADV$$

This formula may be written into the code and run after every encoder sensor falling edge when not in start-up mode to maintain a valid advance value. Advance values or calculations may be performed to determine a Phase Dwell, a Phase Dwell Complement, a Dwell Remainder, an Advance Complement, and a Positive Torque Zone. These values are systematically written into the timer to fire the phases at the appropriate times and duration. These values may be uploaded for every new period (i.e. half of a rotor revolution).

The Positive Torque Zone represents a portion of the rotor/stator radial relationship such that if the phases were energized, they would produce a torque in a positive direction. This zone may be, for example, 75% of quadrature. This would represent about 67.5°. These values may be based on the geometry and functionality of the motor and could include, for example, 82% of quadrature or about 73.8°. The range is due to an influence of latencies and coil charge and adjacent coil discharge. These delays warrant turning the coils on sooner and leaving them on longer without the cost of appreciable negative torque. Using the exemplary lamination profile, a Positive Torque Zone of about 82% may be used for maximum torque/lower speed and lesser values for lower torque/higher-speed. Applying current to the coils at locations apart from what is represented as the positive torques zone may result in either no torque or negative torque that would produce braking of the rotor.

Figure 13A:
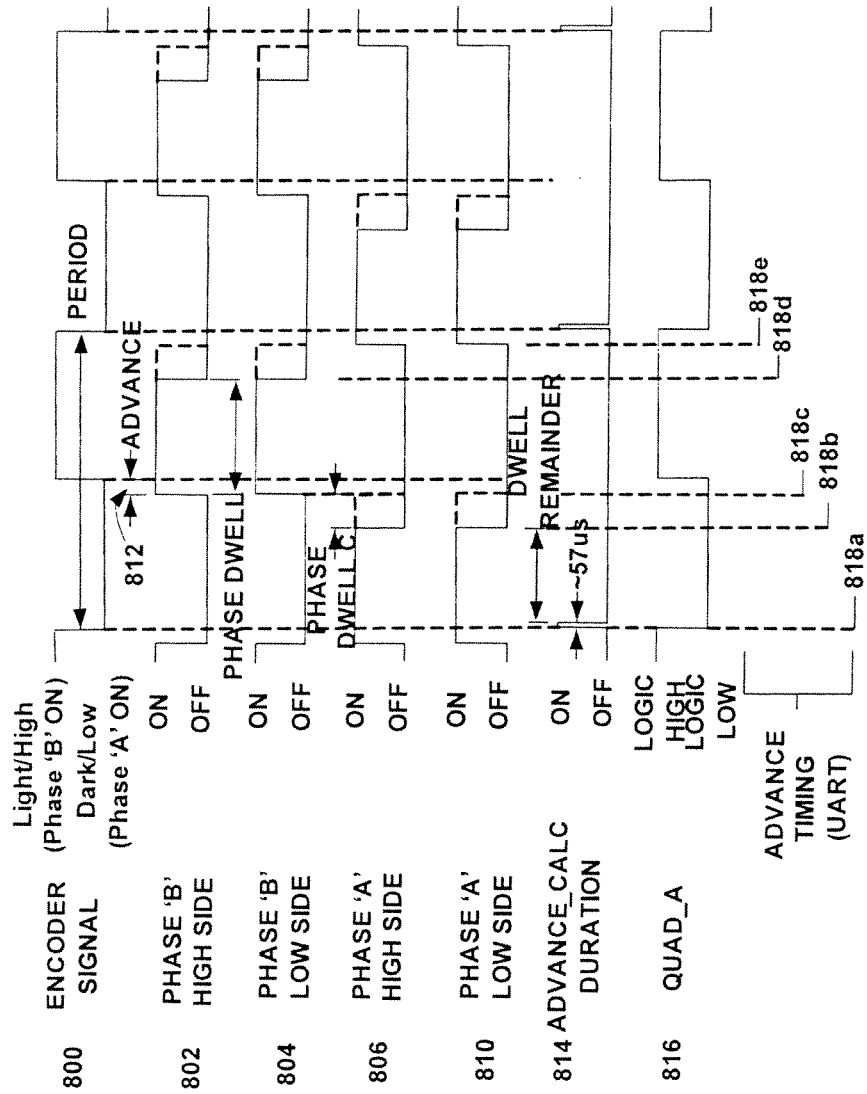
FIG. 13A illustrates a torque and phase control routine for the switched reluctance motor.

FIG. 13A illustrates a detailed look at the high side and the low side switch events within the acceleration routine. The wave form 800 illustrates the signal received from the opto-sensing assembly 508. The wave form in 802 illustrates the high side of phase 'B' and wave form 804 illustrates the low side of phase 'B'. The wave form 806 illustrates the high side of phase 'A' and wave form 810 illustrates the low side of phase 'A'. The time 812 represents the phase timing advance. Also illustrated in FIG. 13A is a timing diagram 814 illustrating the advance calculation time duration and a timing diagram 816 illustrating the logic for QUAD_A. Also illustrated in FIG. 13A are advance time values 818*a*-818*e* that may be loaded for use within the acceleration routine.

As shown in the examples of FIGS. 13B-13G, in order to maximize a torque of the motor and allow for the motor to operate within acceptable current levels and/or voltages a routine may be utilized to adjust the net current by changing a dwell of the active phases. This can be achieved by continually monitoring the current. The current may be monitored with the use of analog-to-digital circuitry, for example. In one embodiment, if the current exceeds a high threshold, a dwell of the active phase may be reduced from a high dwell state of a half period to a low dwell state. The high dwell state may be approximately 95% of a half-period and a low dwell state may be approximately 85% in one example. In another example, the dwell of an active phase may be reduced from a high dwell state of 90% of a half-period to a low dwell state of 80%. In another embodiment, if the current is reduced due to, for example, a voltage decrease to a point of a low threshold, the dwell of the active phase may be toggled from a lower dwell state to a higher dwell state. A separation between the high and the low threshold may keep the system from reciprocating between the two levels. In yet another embodiment, the routine may utilize a cut off point where the motor stops and enters a fault state if the current continues to rise above the maximum threshold while operating in a reduced dwell state. This is a helpful feature for motors operating on un/(de voltage range. In one example, input voltages between 12 volts DC and 9 volts DC can be tolerated by a relative decrease in current supplied to the windings based solely on reduction of the voltage. System output may be tolerated at lower levels because these voltages are unusual in most applications.

There may be many cases in which the current and/or voltage may exceed a threshold and a dwell state may need to be changed. In one example, when the alternator in the vehicle is turned on an increase in voltage may occur causing a change in current. If the alternator is not running, such as when the engine is turned off, and the vehicle battery is the only source of power, the voltage may drop below acceptable levels. In another example, if a motor coil is damaged, a current spike may occur requiring a change in the dwell. In such cases, to respond to the change current and/or voltage levels, a routine to adjust the net current by changing a dwell of the active phases may be ran.

In order for the motor code to change to another routine during operation, an interrupt may be used. In the context of microcontroller design, an interrupt is an asynchronous event that causes an immediate transfer of user program flow from its current execution loop to an interrupt service routine (ISR). The purpose of interrupts is to provide a quick, deterministic response to an external event without the need for constant polling in the main foreground program routine. An ISR is just like a normal subroutine of processing instructions with one exception. That is, that the ISR may be called or invoked at almost any time, independent of the current foreground execution loop.

An ISR maybe used to capture a timer value immediately in the event it is determined after a debounce that a signal is legitimate and the values accurate. If a valid signal is detected and the encoder sensor is low, various maintenance actions may be performed. The timer may then be reset and restarted for the next time measurement. If a start-up routine is detected, the ISR is completed. If not in start-up routine, the routine may continue to calculate an advance and load a dwell remainder into the timer for a first-time sequence and end the ISR.

An ISR event may be triggered on the completion of every analog-to-digital conversion (e.g. every 12.56 μs). The data result is then retrieved and configured such as, for example, from an initial 11 bits to an 8-bit number. It may then be determined which mode the dwell is in by checking a bit flags register. If the bit is high, a dwell will be set to the high dwell state, such as, 95%, and if it is low, the dwell will be set to the low dwell state, such as, 85%.

Figure 13B:
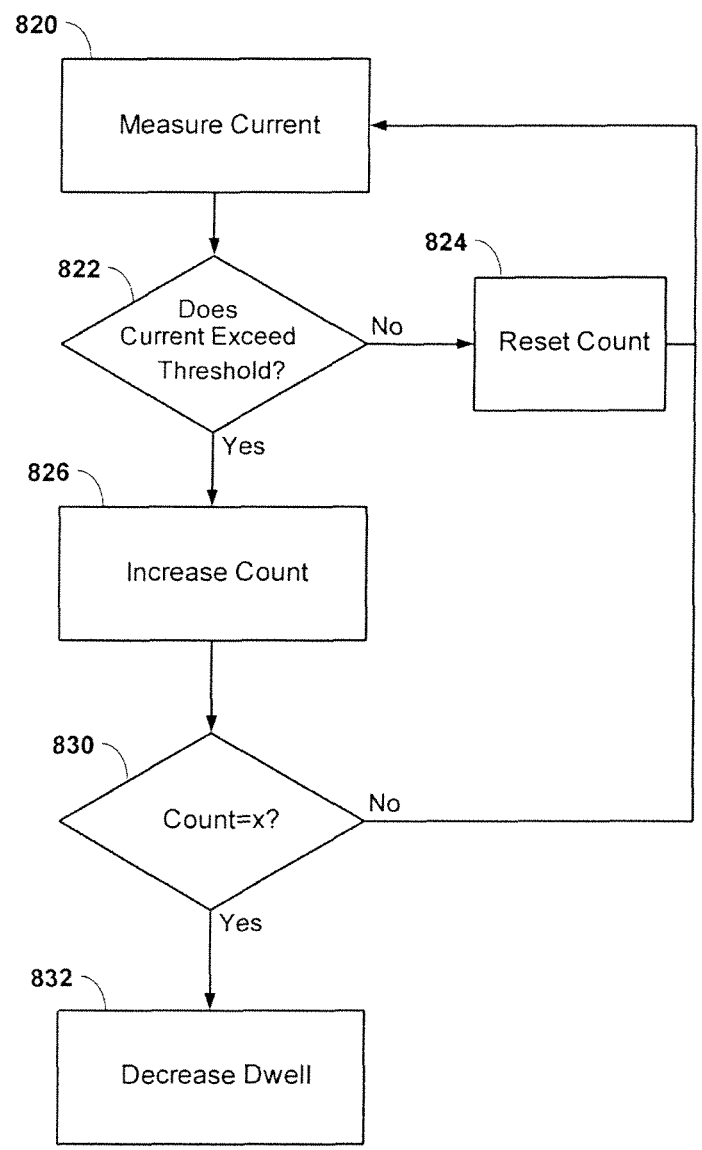
FIG. 13B is a flowchart of a routine that may be used to adjust for the effect of increasing voltage on current draw while operating in a higher dwell state.

FIG. 13B shows a routine that may be used to adjust for the effect of increasing voltage on current draw while operating in a higher dwell state (a higher percentage dwell). During normal operation of the motor, if the current does not exceed a current limit set for the higher dwell state, such as 95%, the phases may be operated normally. However, if the current limit is exceeded from the most recent analog-to-digital result either through an overflow of the ADC or a comparison between the results in the set limit, then a dwell state routine may be activated. A running count may kept to debounce the ADC reading. That is, the motor code may require consecutive readings above the set limit before changing the dwell state. In one example, the count may be five consecutive readings. Alternatively the routine may change the dwell state after just one measurement over the set limit, thereby setting the count to one. As shown in FIG. 13B, at block 820 the current may be measured. A current threshold may be set and the measured current may be compared to the threshold at block 822. If the current does not exceed the threshold then the count may be reset at block 824 and the current may again be measured. Alternatively, the routine may return to normal operation upon measurement of a current value below the threshold. If the measured current is above the threshold, then at block 826 the count is increased. The count may then be compared to a value x at block 830. The value x may be in one example, five, where five consecutive measurements above the threshold triggers a change in the dwell state. If the count does not equal the value x, the current may again be measured at block 820. However, if the count equals the value x, then at block 832 the dwell state may be reduced to a lower dwell state. This is accomplished by changing a variable representing a percent of a half period, which is used by the advance calculation in computing timing for the phases, and updating the program status flag from a higher dwell state such as 95% to a lower dwell state such as 85%.

Figure 13C:
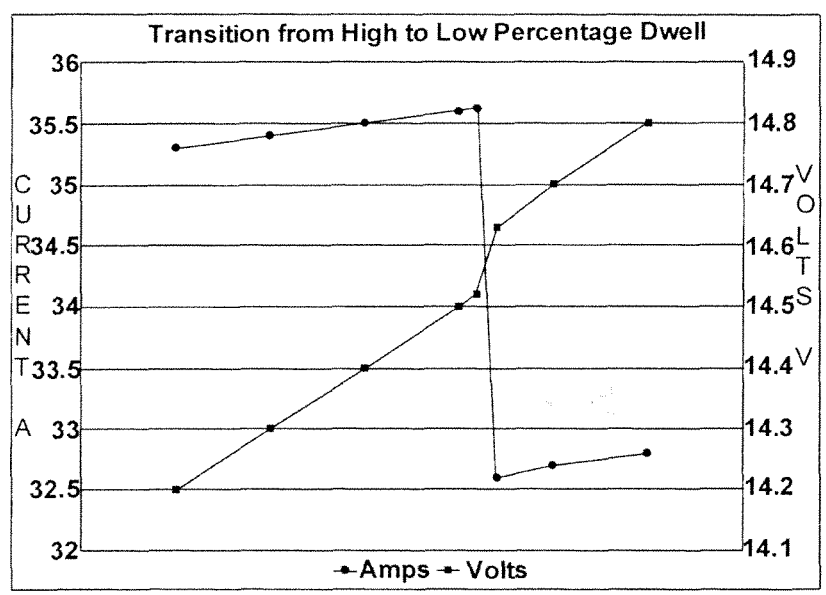
FIG. 13C is a graph showing one example of five consecutive current measurements taken while in a higher dwell state causing a change from a higher dwell state to a lower dwell state.

FIG. 13C is a graph showing one example where five consecutive current measurements are taken above a threshold while in a higher dwell state causing a change from a higher dwell state to a lower dwell state. In the example of FIG. 13C, the increasing voltage causes a corresponding increase in current requiring a change in dwell for the motor to operate in a safe condition.

Once the dwell is changed to a lower dwell state the current may still be monitored to adjust for any sudden changes above or below acceptable levels. For example, once in a lower dwell state, the motor current may drop below acceptable levels, requiring an increase in dwell. If the current level falls between the minimum and maximum values set for the lower dwell state, then the phases may be operated normally. However, if the current level is below the minimum value for the lower dwell state a debounce routine may be run.

Figure 13D:
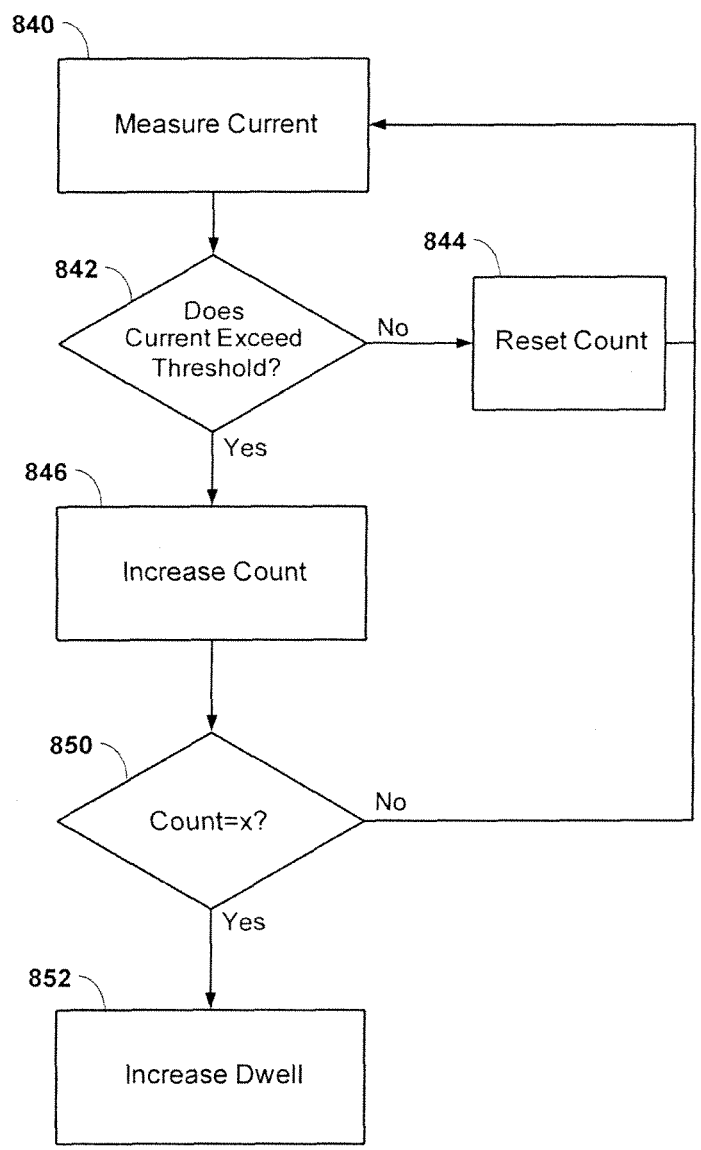
FIG. 13D is a flowchart of a routine that may be used to adjust for the effect of decreasing voltage on current draw while operating in a lower dwell state

FIG. 13D illustrates a routine that may be use to adjust for the effect of decreasing voltage on current draw while operating in a lower dwell state (a lower dwell percentage). A running count similar to the count described above may kept to debounce the ADC reading. In this case, however, the motor code may require consecutive readings below a threshold before changing the dwell state. In one example, the count may be five consecutive readings. Alternatively the routine may change the dwell state after just one measurement over the set limit, thereby setting the count to one. As shown in FIG. 13D, at block 840 the current may be measured. The measured current may be compared to the threshold at block 842. If the current does not exceed the threshold then the count may be reset at block 844 and the current may again be measured. Alternatively, the routine may return to normal operation upon measurement of a current value below the threshold. If the measured current is below the threshold, then at block 846 the count is increased. The count may then be compared to a value x at block 850. The value x may be in one example, five, where five consecutive measurements below the threshold triggers a change in the dwell state. If the count does not equal the value x, the current may again be measured at block 840. However, if the count equals the value x, then at block 852 the dwell state may be increased to a higher dwell state.

Figure 13E:
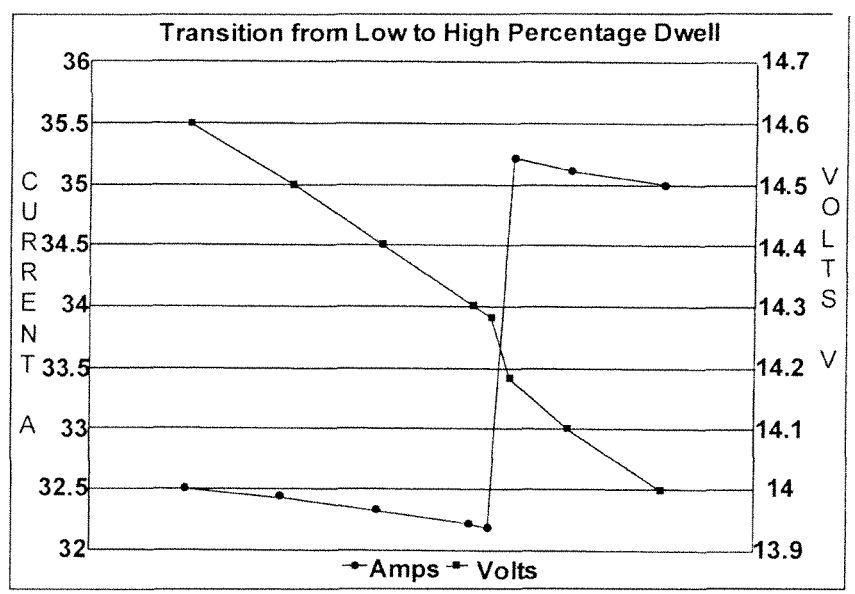
FIG. 13E is a graph showing one example of five consecutive current measurements taken while in a lower dwell state causing a change from a lower dwell state to a higher dwell state.

FIG. 13E is a graph showing one example where five consecutive current measurements below a threshold are taken causing a change from a lower dwell state to a higher dwell state. In the example of FIG. 13D, the decreasing voltage causes a corresponding decrease in current requiring a change in dwell for the motor to operate in a safe condition.

Once the dwell is changed back to the higher dwell state the current may still be monitored to adjust for any other changes above or below acceptable levels. If the current level exceeds the maximum current level, through either overflow of the ADC value higher than the set limit or threshold, a final debounce may be performed.

Figure 13F:
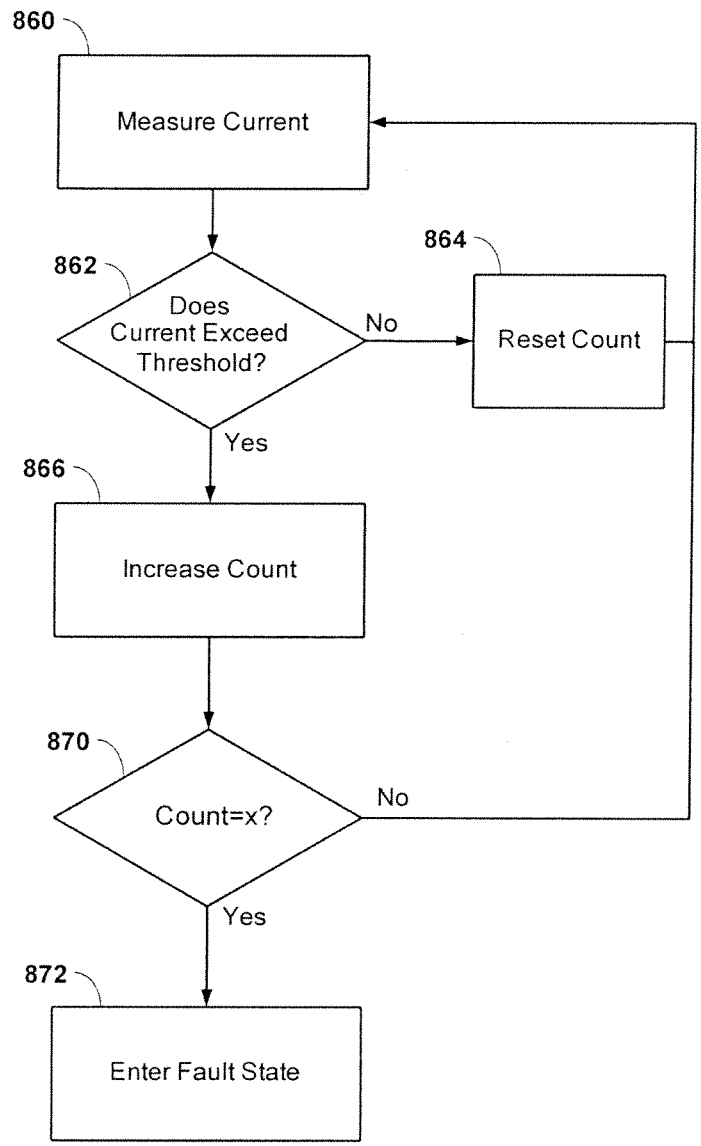
FIG. 13F is a flowchart of a routine that may be use to adjust for the effect of increasing voltage on current draw while operating in a higher dwell state.

FIG. 13F illustrates a routine that may be use to adjust for the effect of increasing voltage on current draw while operating in a higher dwell state (a higher dwell percentage). In one example, the routine of FIG. 13F may be implemented only after a change from a lower dwell state to a higher dwell state. In another example the routine of FIG. 13F may be implemented immediately from a higher dwell state. A running count similar to the count described above may kept to debounce the ADC reading. Similar to the routine described above, the motor code may measure consecutive readings above a threshold. In one example, the count may be five consecutive readings. Alternatively the routine may change the dwell state after just one measurement over the set limit, thereby setting the count to one. As shown in FIG. 13F, at block 860 the current may be measured. The measured current may be compared to the threshold at block 862. If the current does not exceed the threshold then the count may be reset at block 864 and the current may again be measured. Alternatively, the routine may return to normal operation upon measurement of a current value below the threshold. If the measured current is above the threshold, then at block 866 the count is increased. The count may then be compared to a value x at block 870. The value x may be in one example, five, where five consecutive measurements above the threshold triggers a fault condition. If the count does not equal the value x, the current may again be measured at block 860. However, if the count equals the value x, then at block 872 the phases are shut off and a fault state is entered and the corresponding error code loaded. Normal operation of the phases entails utilizing program status flags to fire the phases appropriately.

Figure 13G:
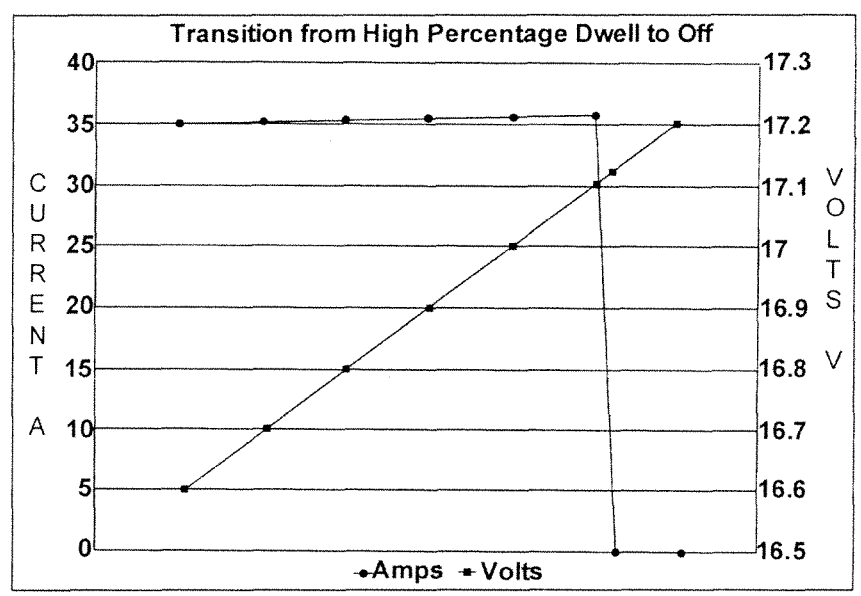
FIG. 13G is a graph showing one example of five consecutive current measurements above a threshold taken causing a fault condition.

FIG. 13G is a graph showing one example where five consecutive current measurements above a threshold are taken causing a fault condition. In the example of FIG. 13F, the increasing voltage causes a corresponding increasing in current thereby causing the phases to shut off and a fault state to be entered and the corresponding error code loaded.

Although the routines in FIGS. 13B-13G above are described with a specific sequence, one of ordinary skill would understand that the routines described above may be run in any sequence or run without requiring any other routine to be run first. For example, the routine described in FIG. 13D may be run first if the motor starts in a lower dwell state instead of a higher dwell state. In another example, the routine of FIG. 13F may be run first putting the motor code in a fault state after the first high current measurement.

An ISR may become active when it is determined that the motor is not in start-up mode, wherein the ISR resets itself and reloads new values based on new values developed by an advancement calculation routine. This sequencer operates through one period and starts over again at each encoder sensor falling edge as long as the motor is not in start-up mode.

To ensure that the motor does not spin at an unsafe speed, a maximum speed check is carried out during each phase advance calculation. The known period captured from the count of a timer is compared to a minimum period for the highest allowable speed. If the current period is shorter than this limit, relating to a higher speed, then the phases are shut off and the system enters a fault state.

For the same purpose as the pulse count in a slow speed, there is also a check in SP to make sure that the encoder signal, if interrupted or lost, does not jeopardize the operation of the motor. This is accomplished by maintaining a count of how many PWM pulses have occurred since the last encoder signal was received. If the count reaches the limit before the encoder has updated, then the motor phases are shut off before entering a fault state.

Figure 14:
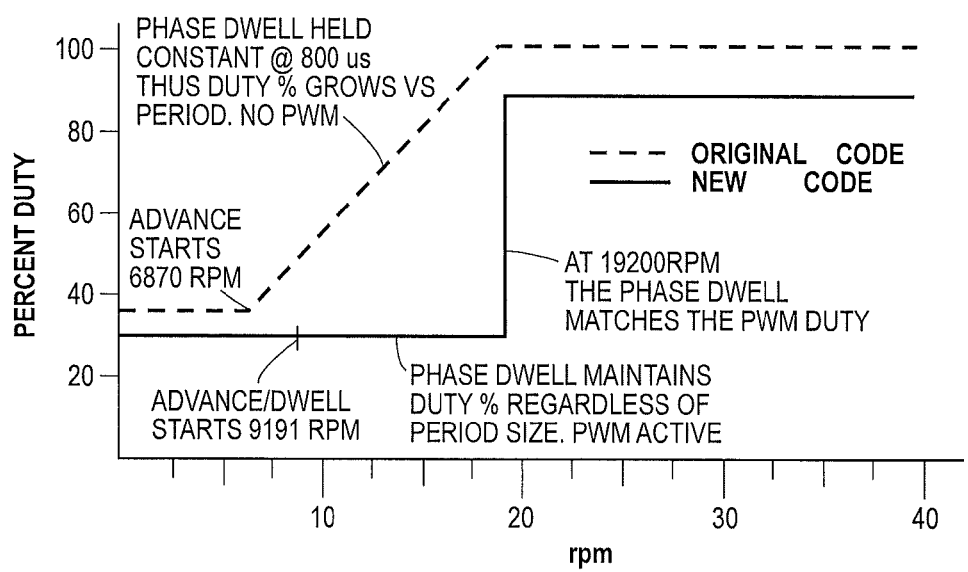
FIG. 14 illustrates the difference between the prior art motor control duty versus rpm as compared to an example of the disclosed embodiment.
Figure 15:
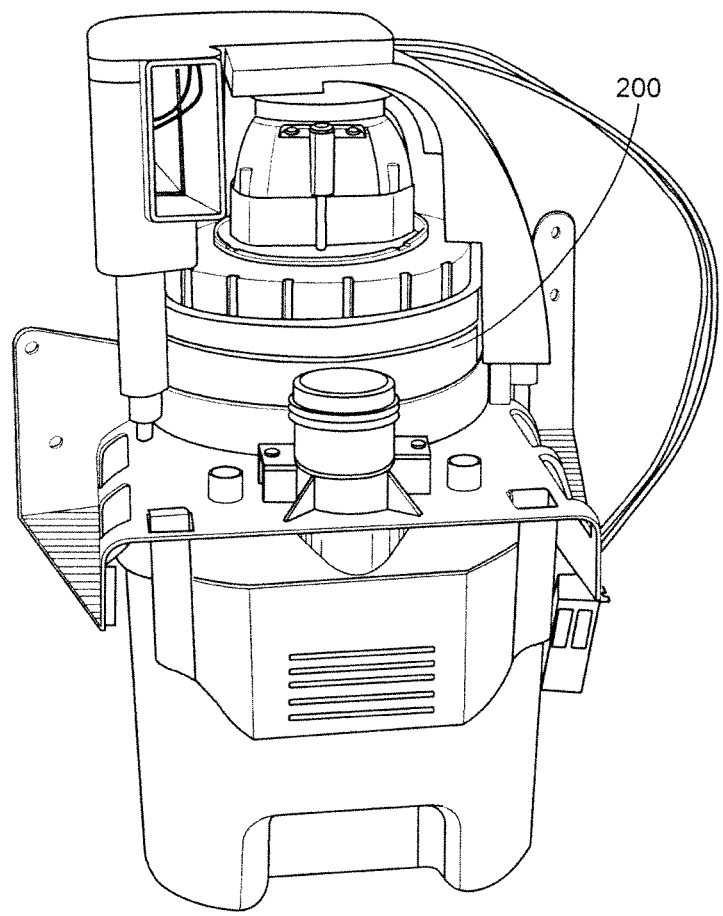
FIG. 15 is a front view of the motor/fan assembly, the chassis wall, and the removable tank.

FIG. 14 illustrates the difference between the prior art motor control duty versus rpm as compared to an example of the disclosed embodiment. The net positive torque has been proven to result in better handling of phase control. A motor constructed in accordance with the disclosed embodiment reduces the firing of phases in the area of negative torque, thus reducing braking and allowing a motor to operate faster and audibly quieter.

Cooling of the Motor and Electronic Components

Figure 16:
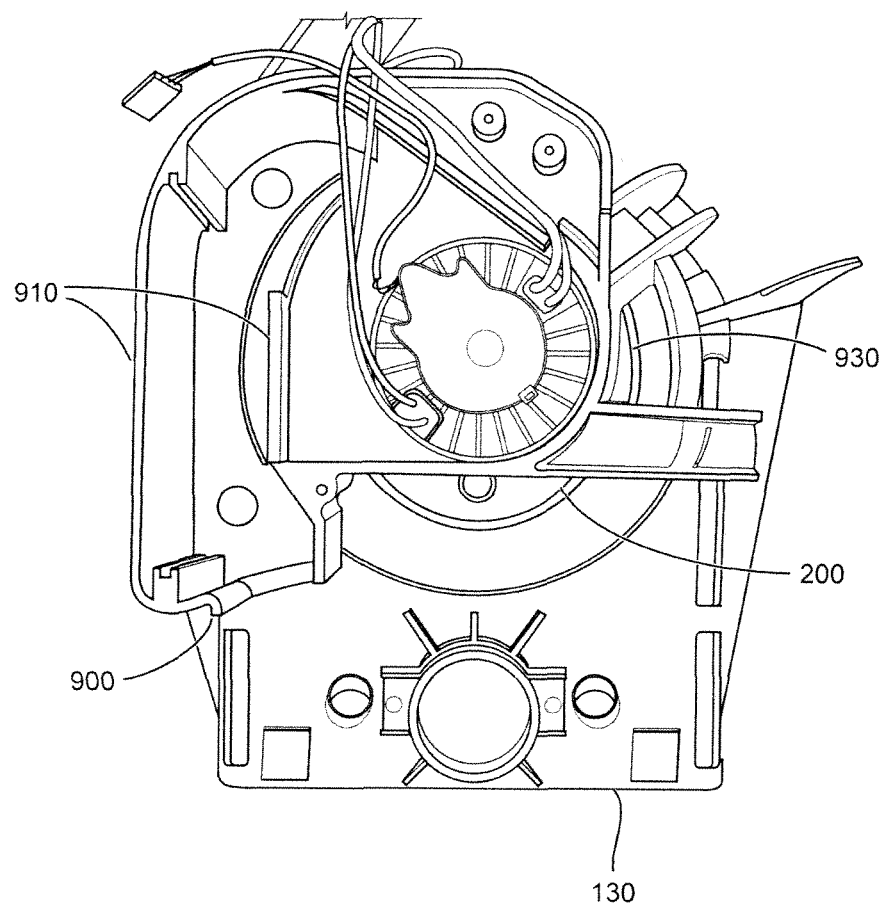
FIG. 16 a view of the top of the motor/fan assembly and the chassis wall, with the circuit board and cover removed.
Figure 17:
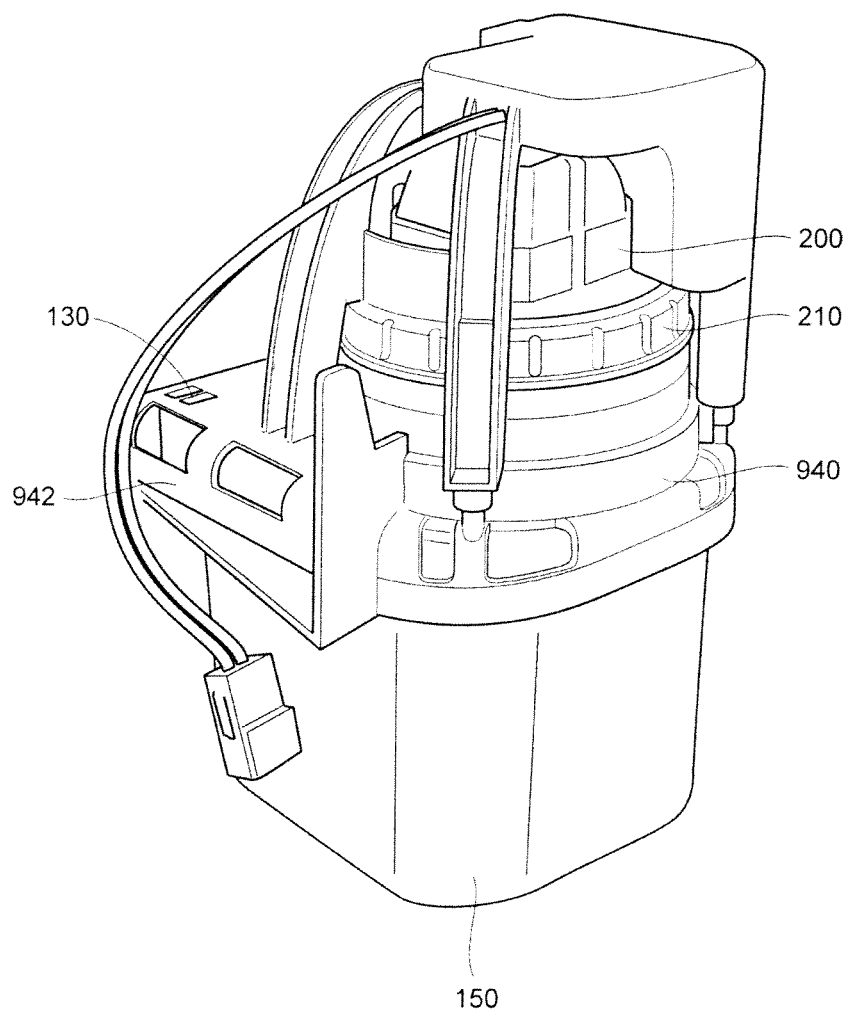
FIG. 17 is a back view of the motor/fan assembly, the chassis wall, and the removable tank.
Figure 24:
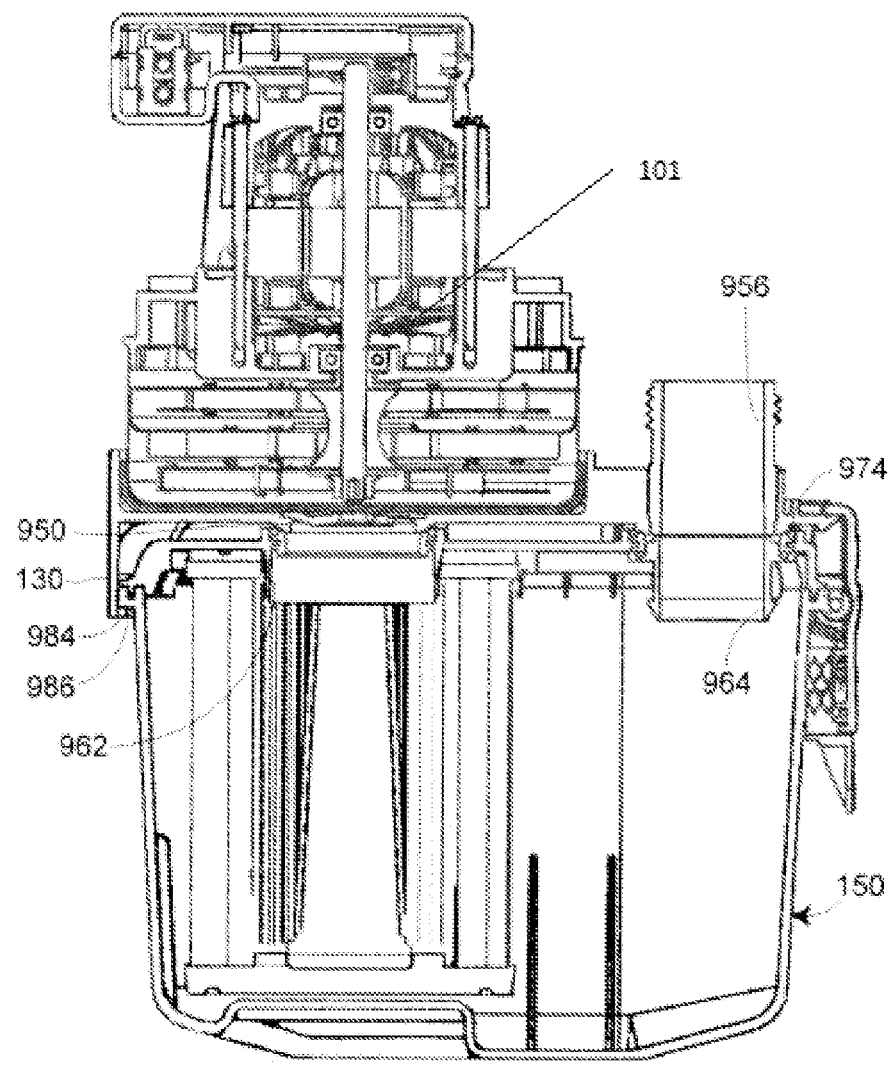
FIG. 24 is a side cross-sectional view of the tank in a mounted position.

Because the electronic controller for a brushless motor or an SR motor can run hot, a separate cooling airflow may be useful to prevent overheating. The illustrated system 100 is ducted to provide such an airflow. The airflow is powered by blades on a cooling fan 101 FIG. 24) that is mounted on the motor shaft, near the base of the motor 200. The cooling fan could, for example, be an axial fan. Drawn by this cooling fan, a cooling airflow enters the cavity 102 through a cooling air intake 900 (FIG. 1) on the cabin wall segment 108, near the circuit board 220. Ducting walls 910, best seen in FIGS. 3 and 16, form boundaries of a cooling air pathway that leads directly from the cooling air intake to the circuit board. Airflow past the circuit board helps to cool the electronic components.

This cooling air is drawn by the cooling fan from the cabin across the circuit board 220 to the top of the motor 200, and then down through the center of the motor to the cooling fan. The cooling fan then blows the air outwardly. Four D-shaped openings 930 at the outer edges of the bottom of the motor enable the cooling air to be blown into the cavity 102, where it joins the exhausted working air and can be exhausted from the vehicle. This flow path for the cooling air minimizes the possibility that air that has been heated by the motor will be re-circulated into the cabin, helping to ensure that the cabin air stays fresh and will be cool enough to effectively cool the motor and the other components.

The Chassis Wall

Figure 18:
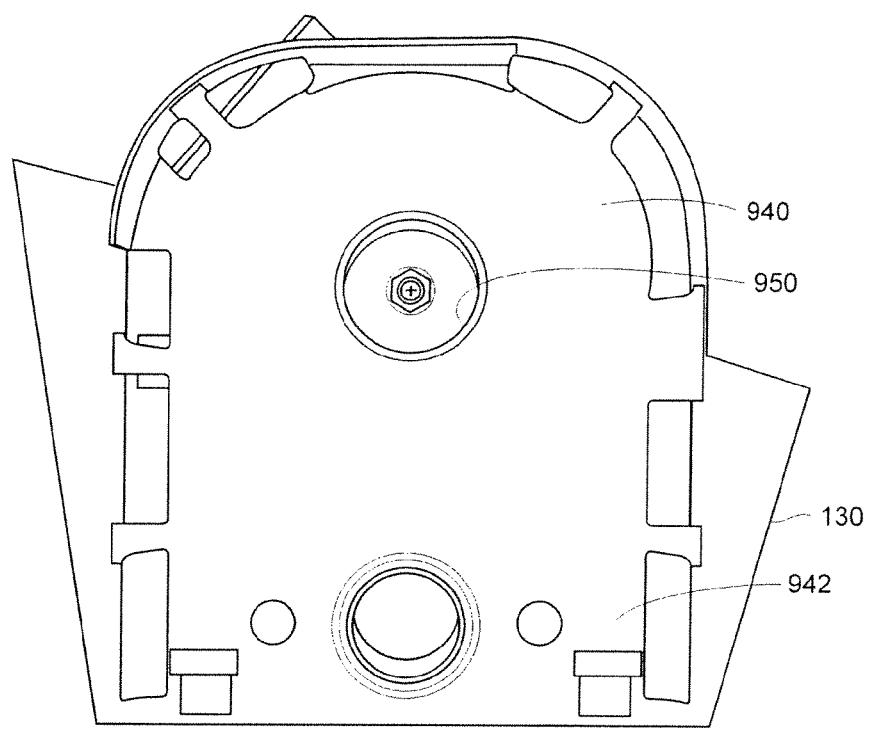
FIG. 18 is a view of the bottom of the chassis wall with the tank removed.

The chassis wall 130, seen in FIG. 18, is positioned beneath the base of the o or/fan assembly 120, and provides a face where the removable tank 150 can be connected, placing the interior of the tank in fluid communication with the main impeller 210 in the motor/fan assembly. The illustrated chassis wall is positioned with a rearward part 940 beneath the motor/fan assembly and a forward part 942 extending toward the interior of the cabin 110. (The cabin can include a separate compartment that is accessed from the main cabin through an access door.) In this arrangement, a motor boot gasket 646 (FIG. 3A) is positioned between the chassis wall and the motor/fan assembly, helping to seal and vibrationally isolate those two components.

The chassis wall 130 has an impeller opening 950 that opens directly to the axis of the main impeller 210. Close positioning of the impeller opening to the axis of the impeller, unimpeded by turns, enables the main impeller to efficiently draw air up through the impeller opening.

Figure 19:
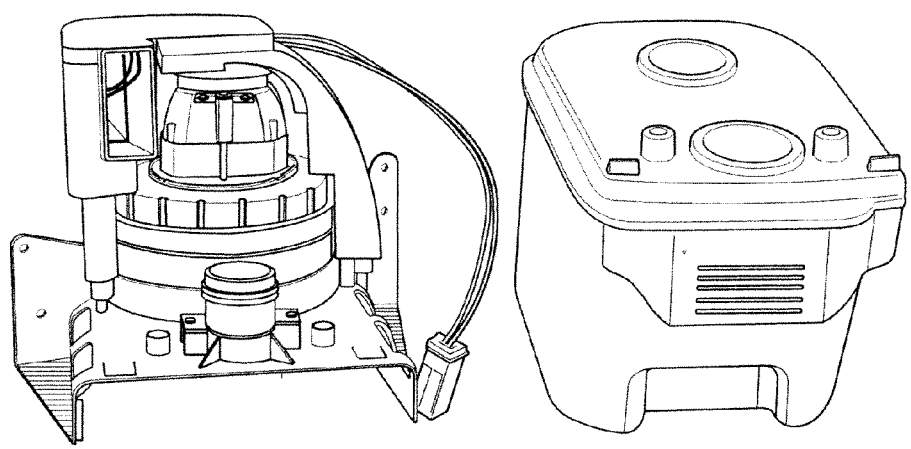
FIG. 19 is a perspective view of the motor assembly and the tank.

In the illustrated arrangement, a short connector 954, seen in FIG. 19, is provided on the forward part 942 of the chassis wall 130. This connector serves as an attachment point for the hose 140, and directs dirty air from the hose through a hose opening 956 into the tank. The straight shape and short length of the connector (no more than a few inches) reduces the risk of entrained dirt or debris becoming clogged within the assembly, requiring an expensive or laborious repair.

The hose

The vacuum hose 140 seen in FIG. 2 extends into the cabin 110 from the short connector 954 on the chassis wall 130. The hose has a suction end that can be directed by the user to areas of the vehicle to be cleaned. In the illustrated arrangement, the hose may be detachable from the connector to facilitate storage, replacement, or cleaning of the hose. Preferably, however, the connector is positioned in a hose compartment within the cabin 110, where the hose may be stored in place without the need to detach the hose when not in use. Many different types of hoses (with or without nozzles at the suction end) are known and can be used, but a collapsible hose may be desirable to facilitate storage of the hose when not in use.

The Removable Tank

Figure 20:
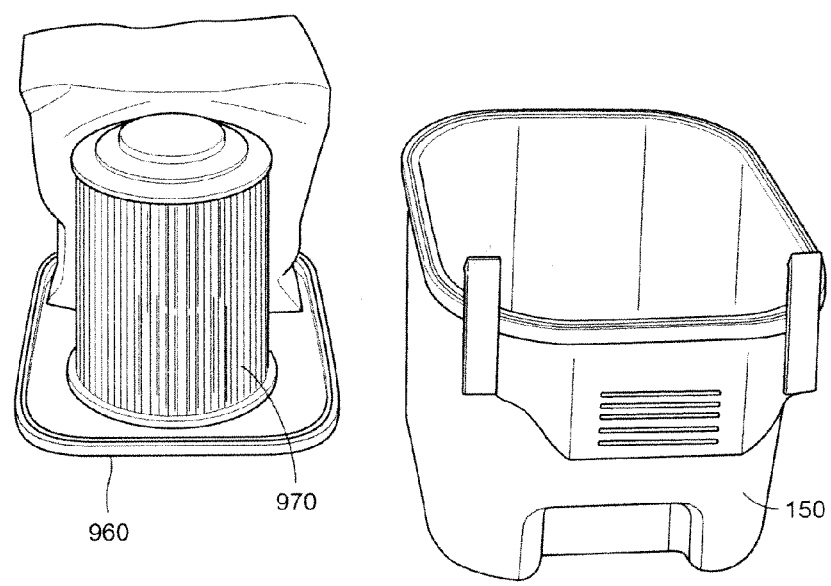
FIG. 20 is a view of the tank with the lid removed and inverted.
Figure 21:
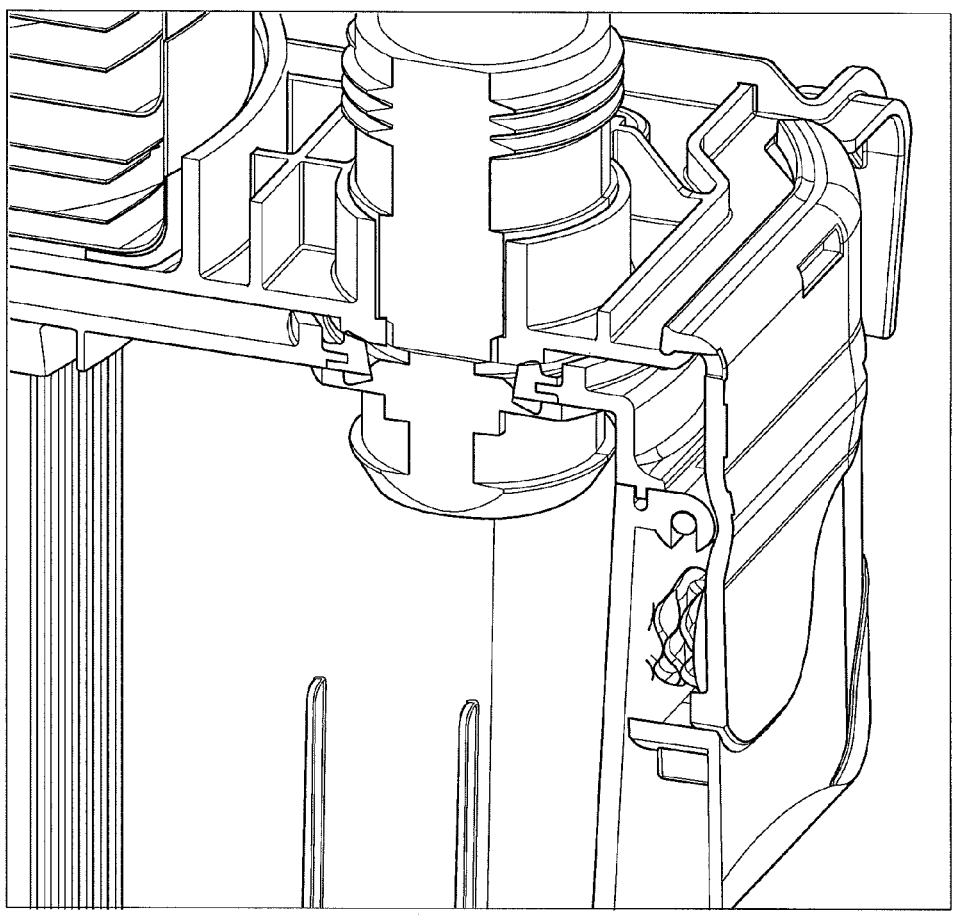
FIG. 21 is a fragmentary perspective view showing details of an alternative chassis wall and release lever.

The tank 150, seen in FIGS. 19 and 20, is used to store dirt and debris collected through the hose. The tank can be moved between a mounted position (for storage or active vacuuming) and a removed position (for emptying dirt and debris collected in the tank.) The illustrated tank has a removable top lid 960 that helps to reduce the chance of dirt or debris being spilled while the tank is being moved. In the mounted position, an outlet 962 that is positioned on a rearward part of the lid aligns with the impeller opening 950 on the chassis wall 130, placing the interior of the tank in fluid communication with the main impeller 210. At the same time, an inlet 964 that is positioned on a forward part of the lid aligns with the hose opening 956 on the short connector on the chassis wall, placing the tank in fluid communication with the hose. In this way, the main impeller can draw dirty air through the hose and through the inlet into the removable tank, where it is filtered. The main impeller then draws clean air from the tank.

The illustrated design permits a user to conveniently remove the tank 150, disconnecting both the inlet 964 from hose opening 956 and the outlet 962 from the impeller opening 950 in a single motion. This design also eliminates the need to separately disconnect the hose 140 from the tank if the user desires to move the tank without having to also carry the hose.

As seen in FIG. 20, the illustrated tank 150 has a cartridge filter 970 that removably connects to the lid 960. The cartridge is arranged so that a central passage on the filter is aligned with the impeller opening 950. As is known in the art, a filter bag 972 can also be used in place of or along with a replaceable cartridge. Whichever arrangement is used, air from the tank is cleaned (in this case by being forced through a filter) before being drawn up through the outlet 962 to the main impeller 210.

Spinning outwardly from the main impeller, this working air joins the cooling air flow and exits the cavity 102 between the cabin wall segment 108 and the exterior panel 104 of the vehicle. In the illustrated embodiment of the invention, the air exits the cavity through the air release opening 160, but other arrangements are possible.

To help prevent airflow (or debris) leaks between the tank 150 and the chassis wall 130, a dirty air gasket 974 can be mounted to the lid 960, around the inlet 964. This gasket fits between the lid and the short connector 954 when the tank is in the mounted position, sealing the connection. Similarly, a clean air gasket 976 can be mounted around the impeller opening 950. This gasket fits between the lid and the impeller opening when the tank is in the mounted position, sealing that connection.

Figure 22:
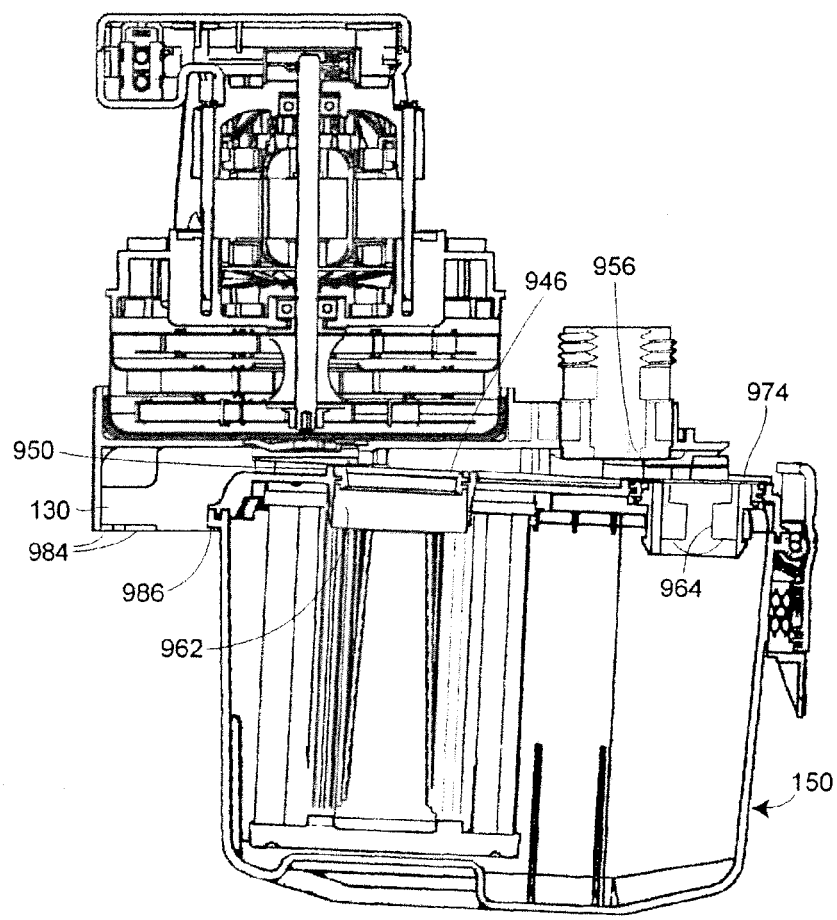
FIG. 22 is a side cross-sectional view of the tank in a forward position.
Figure 23:
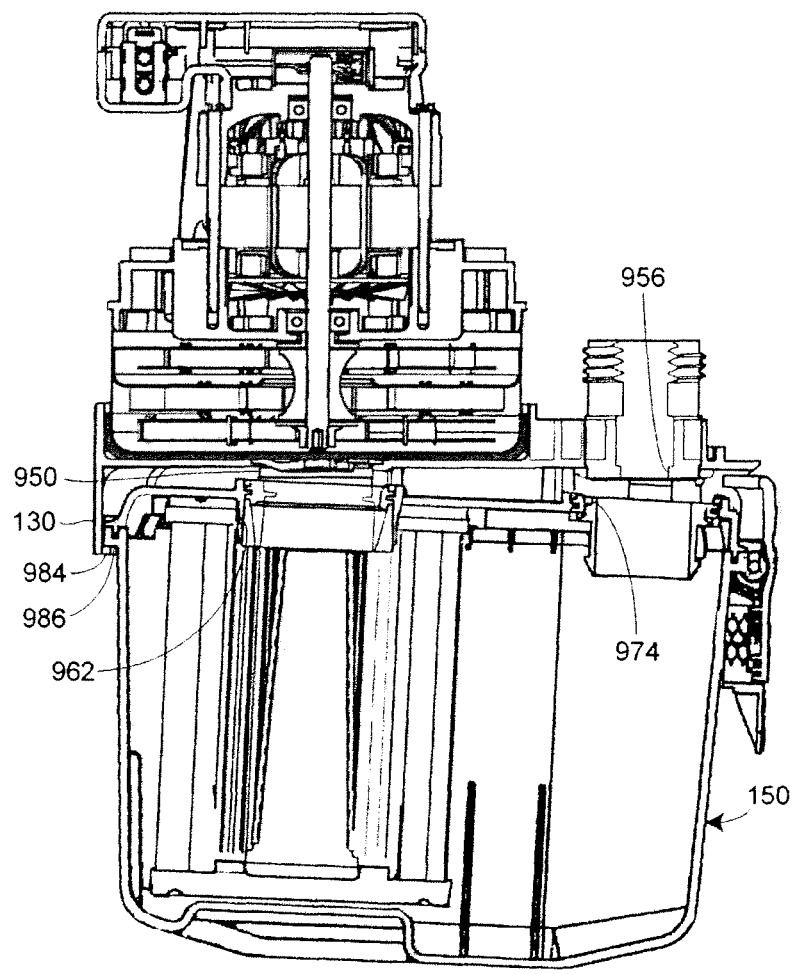
FIG. 23 is a side cross-sectional view of the tank in a rearward position.

Installation and removal of the tank is particularly useful and efficient. Narrow lateral flanges 980 are positioned on opposed sides of the tank 150. In this illustration, the flanges are positioned near the top of the side walls of the tank, but other arrangements are possible These flanges fit onto narrow angled ramp portions 982 that are connected to the chassis wall 130. When resting upon the ramp portions, the flanges support the tank so that it can be moved in a generally horizontal sliding motion that moves the tank from a forward position seen in FIG. 22, where the rearward part of the tank is forward of the back of the chassis wall, to an elevated rearward position seen in FIG. 23, where the rearward part of the tank is near the rearward edge of the chassis wall. The angle of the ramp portions makes initial alignment of the tank on the ramp portions easier, and also enables the gaskets 974, 976 to pass beneath the forward edge of the chassis wall as the tank slides rearward.

The rearward part of the illustrated tank 150 has a narrow rear flange 984. When the tank is moved to the rearward position, the rear flange engages a lip 986 near the rearward edge of the chassis wall 130. In this rearward position, the angle of the ramp portions 982 leaves the forward part of the tank spaced somewhat beneath the upper forward edge of the chassis wall. The engagement between the lip and the rear flange supports the tank, and enables the user to pivot the forward part of the tank upwards, moving the tank from the rearward position into a mounted position seen in FIG. 24. This upward pivoting motion also presses the dirty air gasket 974 between the hose opening 956 and the inlet 964, sealing that connection, and presses the clean air gasket 976 between the impeller opening 950 and the outlet 962, sealing that connection.

Bosses 986 on the lid 960 help guide this movement from the rearward position on the ramp portions 982 to the mounted position. The illustrated short, raised, tapered bosses are positioned near the inlet 964. As the tank 150 is pivoted, the alignment bosses fit into and align with aligned openings 988 on the chassis wall 130, helping to guide the tank into the mounted position. The illustrated bosses are between ⅛" and 2" wide and between ⅛" and 1" high. After the tank is mounted, the vertical fit of the bosses into the aligned openings also helps to secure the tank in position if the vehicle is involved in a collision. This fit can help to reduce the risk of the tank becoming a projectile that could otherwise endanger vehicle occupants.

A release lever 990 helps to secure the tank 150 in the mounted position. Although other arrangements can be used, the release levers seen in FIGS. 3 and 21-24 are connected to a forward part of the tank at a pivot. The release lever seen in FIG. 3A has two upwardly-extending latching arms 992. The arms can be spring-biased and can also be made of a resilient material to assist in latching. When the tank moves into the mounted position, two rearward-extending portions 994 of the latching arms latch onto horizontal latch edges 996 on the chassis wall 130, holding the tank in position. In this example, as the tank is pivoted from the rearward position to the mounted position, angled cam surfaces 997 on the top of the latching arms come into contact with a lower surface on the chassis wall. This contact presses the extending sections of the latching arms laterally forward as the latching arms move upwards toward the horizontal latch edges. As the tank moves closer to the mounted position, the cam surfaces release from the lower surface of the chassis wall and, when the tank reaches the mounted position, the latching arms clear the top edge of the horizontal latch edges and snap laterally rearward into engagement with that edge. This engagement of the rearward-extending portions of the latching arms on the horizontal latch surfaces on the chassis wall provides a horizontal support that holds the forward part of the tank in the mounted position.

The release lever seen in FIGS. 21-24 has a continuous latch edge 994' that fits onto the front edge 996' of the chassis wall.

A release arm 998 on the release lever 900 can be used to release the engagement of the latching aims 992 or 992'. The illustrated release arm is located beneath the pivot. When the release arm is pressed rearward, the release lever rotates about the pivot, causing the latching arms to move laterally forward. This motion slides the extending portions of the latching arms off the horizontal latch edges 996 or 996', removing the support of the forward part of the tank 150 and enabling it to pivot down from the chassis wall 130. The downward motion breaks the seals at the impeller opening 950 and at the hose opening 956 and takes the tank to the rearward position in which the lateral flanges 980 on the tank are supported by the angled ramp portions 982. From here, the user can slide the tank forwardly to remove the tank.

In the arrangement seen in FIG. 3, an optional finger recess 1000 is positioned on the forward side of the tank 150, near or at least partially behind the release arm 998. This recess provides a convenient way for a user to hold the forward edge of the tank with her fingers while she presses the release arm, helping to reduce any chance of the tank slipping as it pivots down from the mounted position. The user may also use the recess to slide the tank forward after it has been released from the latch.

This description of various embodiments of the invention has been provided for illustrative purposes. Revisions or modifications may be apparent to those of ordinary skill in the art without departing from the invention. The full scope of the invention is set forth in the following claims.

What is claimed is:

1. A vacuum cleaner system that has:
   a motor/fan assembly that has a brushless motor that is controlled by an electronic controller that is mounted on a face of a generally planar circuit board that has a first lateral edge on a first lateral side of the circuit board and an opposed lateral edge on an opposed lateral side of the circuit board;
   a cooling fan on one axial side of the motor;
   a relatively planar chassis wall on the assembly that has an impeller opening that leads to the motor/fan assembly and a hose opening that connects to a vacuum hose;
   a tank that receives debris through the vacuum hose;
   a lid on the tank that helps to keep debris in the tank when the tank is removed, mounts to the chassis wall, has an outlet that connects to the impeller opening, and has a separate inlet that connects to the hose opening;
   an intake that opens to the environment, is positioned on the front of the vacuum cleaner system, and serves as a source for the cooling air for the vacuum cleaner; and
   ducting walls that form part of a cooling air pathway that leads from the intake to the circuit board, and then to an axial side of the motor opposite the cooling fan, through the center of the motor, to the cooling fan; the circuit board being arranged so that the flow of cooling air from the intake flows first past one of the opposed lateral edges of the circuit board, then across the face of the circuit board toward the other of the opposed lateral edges of the circuit board before flowing to the axial side of the motor.

2. A vacuum cleaner system as recited in claim 1, in which:
   the circuit board is positioned alongside the motor and extends generally parallel to the axis of the motor.

3. A vacuum cleaner system as recited in claims 1, in which:
   the tank is arranged for removal in a direction toward the front of the tank; and
   the circuit board is positioned alongside the motor and extends generally parallel to both the axis of the motor and the direction in which the tank is arranged for removal.

4. A vacuum cleaner system as recited in claim 1, in which:
   the system is arranged so that removal of the tank breaks seals between the outlet and the impeller opening and between the inlet and the hose opening.

5. A vacuum cleaner system as recited in claim 1, in which:
   the system also has a chassis wall that has a hose opening that connects to the vacuum hose; and
   the tank is arranged for removal without tools and without detaching the vacuum hose from the hose opening.

6. A vacuum cleaner system as recited in claim 1, in which:
   the motor is a brushless motor; and
   the system also has an impeller that draws working air into the tank and is mounted on the same shaft as the cooling fan, on the same side of the motor as the cooling fan.

7. A vacuum cleaner system as recited in claim 1, in which:
   the motor is a switched reluctance motor; and
   the system has wires that are positioned in the cooling air pathway leading to the motor.

8. A vacuum cleaner system as recited in claim 1 that also has:
   a fixed flange that supports a back side of the tank and enables a user to removably secure the tank on the chassis wall with access to only a front side of the tank;
   flanges that support the tank for removal from the chassis wall by sliding movement in a direction toward the front of the tank.

\* \* \* \* \*